(12) United States Patent
Kimura et al.

(10) Patent No.: US 6,228,480 B1
(45) Date of Patent: *May 8, 2001

(54) PHOTOCATALYST-CARRYING STRUCTURE AND PHOTOCATALYST COATING MATERIAL

(75) Inventors: Nubuo Kimura, Oiso-machi; Shinji Abe; Tetsuo Yoshimoto, both of Kanagawa; Shigemichi Fukayama, Oiso-machi, all of (JP)

(73) Assignee: Nippon Soda Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/981,303

(22) PCT Filed: Jun. 18, 1996

(86) PCT No.: PCT/JP96/01669

§ 371 Date: Mar. 18, 1998

§ 102(e) Date: Mar. 18, 1998

(87) PCT Pub. No.: WO97/00134

PCT Pub. Date: Jan. 3, 1997

(30) Foreign Application Priority Data

| Jun. 19, 1995 | (JP) | 7-175422 |
| Dec. 20, 1995 | (JP) | 7-349334 |
| Dec. 20, 1995 | (JP) | 7-349335 |
| Dec. 20, 1995 | (JP) | 7-349336 |
| Dec. 20, 1995 | (JP) | 7-349337 |
| Dec. 20, 1995 | (JP) | 7-349338 |
| Dec. 28, 1995 | (JP) | 7-353742 |
| Jan. 29, 1996 | (JP) | 8-034350 |
| Feb. 15, 1996 | (JP) | 8-052469 |
| Feb. 26, 1996 | (JP) | 8-063673 |
| May 21, 1996 | (JP) | 8-150115 |

(51) Int. Cl.$^7$ .................. B01J 35/02; C09D 7/00
(52) U.S. Cl. ........... 428/328; 106/287.13; 106/287.16; 106/287.19; 428/329; 428/330; 428/331; 428/429; 428/447; 428/448; 428/451; 428/452; 502/158; 502/236; 502/242; 502/350
(58) Field of Search ........................... 428/328, 329, 428/330, 331, 429, 447, 448, 451, 452; 106/287.13, 287.16, 287.19; 502/158, 236, 242, 350

(56) References Cited

U.S. PATENT DOCUMENTS

| 5,415,690 | 5/1995 | Watanabe .................. 106/287.16 |
| 5,547,823 | 8/1996 | Murasawa et al. .............. 430/531 |
| 5,853,866 | 12/1998 | Watanabe et al. ............. 428/312.8 |

FOREIGN PATENT DOCUMENTS

| 119331 | 3/1983 | (EP) . |
| 0 633 064 | 1/1995 | (EP) . |
| WO96/14932 | 5/1996 | (JP) . |

OTHER PUBLICATIONS

Supplementary Partial European Search Report dated Feb. 24, 1999.
Supplementary European Search Report dated May 31, 1999.

Primary Examiner—D. S. Nakarani
(74) Attorney, Agent, or Firm—Venable; Marina V. Schneller; Charlotte McGuiness

(57) ABSTRACT

The present invention provides a photocatalyst-carrying structure which has a structure, wherein an adhesive layer is provided in between a photocatalyst layer and a substrate, the adhesive layer is composed of silicon-modified resin, polysiloxane-containing resin or colloidal silica-containing resin, and for forming the photocatalyst layer a composition comprising a metal oxide gel or a metal hydroxide gel and a photocatalyst is used. Further, the present invention also provides a photocatalyst coating agent for producing a photocatalyst-carrying structure which contains silicon compound, at least one metal oxide sol or metal hydroxide sol, and at least one photocatalyst powder or sol.

30 Claims, 1 Drawing Sheet

PHOTOCATALYST-CARRYING STRUCTURE AND PHOTOCATALYST COATING MATERIAL

FIELD OF THE INVENTION

The present invention is related to a structure carrying a photocatalyst which is useful for antifouling, cleaning water, deodorization, pasteurization, a treatment of waste water, decomposition of water, a control of algae growth and various chemical reactions.

BACKGROUND ART

Titanium dioxide, which is n-type semiconductor, has been known as a photocatalyst that activates various chemical reactions with ultraviolet radiation energy, such as chemical reactions resulted in during a process of decomposition of water, deodorization, pateurization, cleaning of water, a treatment of waste water or the like. It is said that the catalytic activity of a photocatalyst can be generally high when it is used either in powder form or in a form of suspension in a solvent, however, in many cases, such photocatalyst is practically obliged to be used in a form being carried on a certain substrate. For utilizing ultraviolet radiation energy from light efficiently, it is advantageous to make a substrate into a shape like a paper or a sheet, which can secure the wider light irradiation area, moreover, it is further advantageous to make the surface of the substrate into a porous structure in order to increase contacting area of the substrate with a reactant with which an objective chemical reaction is desired to be proceeded in the presence of a photocatalyst.

Various substrates which comprise a photocatalyst have been proposed in the past. For example, (A) a light transmissible material, such as cellulose nitrate, glass, poly(vinyl chloride), plastics, nylon, methacrylic resin and polypropylene, is disclosed in Japanese Patent Laid-opened No. Sho 62-66861, (B) polypropylene fibers and ceramics are disclosed in Japanese Patent Laid-opened No. Hei 2-68190, and (C) glass, ceramics, nylon, acryl and polyester resins are disclosed in Japanese Patent Laid-opened No. Hei 5-309267.

However, among the materials as disclosed above, it is reported that the one comprising an organic material as its main component has the disadvantage that the organic material can be decomposed and deteriorated due to catalytic reaction caused by a photocatalyst contained in the said material, and the durability thereof has therefore been problematic (see Pumiaki OotaniO Kobunsi Kako No.42, vol.5, page 18 (1993); "Titanium dioxide", by Manabu Kiyono, published by Gihodo, page 165).

Further, even though the substrate is composed of an inorganic material, such as glass and ceramics, there must be some problems in the durability property of the substrate, such that, if an organic polymer resin is used as an adhesive for carrying a photocatalyst on the substrate, the photocatalytic activity may be lowered due to coverage of the surface of photocatalyst particles with such resin, and that the photocatalyst may be exfoliated from the substrate due to the cause of decomposition and deterioration of said organic polymer resin by virtue of its photocatalytic activity.

In order to avoid having such problems as described above, a method called spattering method whereby any organic materials do not remain (Japanese Patent Laid-opened No. Sho 60-044053), a method to coat and bake an organic titanate (Japanese Patent Laid-opened No. Sho 60-118236), a method to spray and bake titania sol (Japanese Patent Laid-opened No. Hei 5-253544), and the others have been employed, in case that the substrate used is an inorganic heat-resistant material.

However, these methods have a problem that they require a process of baking the substrate at a high temperature in order to obtain production and crystallization of photocatalyst particles over the substrate and adhesive property with the substrate, and therefore, it is difficult to carry photocatalyst over a wide area and the production according to these methods requires very high cost.

Whereas, for carrying a photocatalyst onto a glass fiber paper, a method to use a metal oxide sol as an adhesive has been proposed (see Japanese Patent Laid-opened No. Hei 5-309267).

However, the adhesive property of a metal oxide sol, such as silica sol, is very weak because it is derived from van der Waars force (see Fine Ceramics, vol.1, page 216–223, 1980) so that the binding strength and durability of the adhesive were insufficient. Further, the method additionally requires a process of baking at a high temperature, and therefore, it was not applicable for all types of substrates including commonly used types of resins which are easily decomposed by heating.

In an example wherein a metal oxide, such as silica gel and clay mineral, in a sol state carrying photocatalyst powder thereon, there is a report that the photocatalytic decomposition reaction of propione aldehyde gas is accelerated by virtue of the effect of a substrate as an adsorbent (see Symposium, "Recent development in Photocatalytic Reaction", previous manuscripts, by Society for the Study of Photofunctional Materials, No.2–11, page 39, 1994).

However, no report has been made up till now describing that a substrate having excellent adhesive property and durability while keeping the high photocatalytic activity of a photocatalyst which is uniformly distributed in a metal oxide sol as described above is obtained.

Whereas, a method to fix a photocatalyst by using a fluororesin has been also proposed (see Japanese Patent Laid-opened No. Hei 6-315614). However, the price of fluororesin is high, and it is required to cover the most of the surface of photocatalyst particles with fluororesin in order to stick photocatalyst particles strongly. Accordingly, the catalytic activity of a photocatalyst becomes lower than the activity given by the same photocatalyst in powder form. Although an example that intends to carry a photocatalyst onto a substrate by means of mixing the photocatalyst with a binder resistant to decomposition, such as fluororesins and poly(organosiloxane), has been known (see EP-0633064), it is not sufficient to solve practically such problems as to adhesive property and durability.

As described above, the following three points can be given as problems to be solved when carrying a photocatalyst onto a substrate, which are (1) an adhesive property between a photocatalyst and a substrate should be good, (2) the photocatalytic activity of a photocatalyst does not degrade when it is carried onto a substrate, and (3) both of a substrate and an adhesive should not be deteriorated due to presence of a photocatalyst carried thereon and the substrate can keep its binding strength, durability and catalytic activity. Furthermore, when using a photocatalyst-carrying structure under a condition of a high temperature and high humidity, a property to maintain excellent adhesive property after dipping it into boiling water is required for the structure, for example.

Whereas, it is required for a photocatalyst coating material used for carrying a photocatalyst onto a substrate a property that the photocatalyst coating material causes neither its viscosity increase nor its particle sedimentation even after the preservation for at least one month and preferably more than three months. Also, a property that enables to carry a photocatalyst onto a substrate without deteriorating its photocatalytic activity when coating the photocatalyst onto a product for practical use, is required as well.

The inventors of the present invention have found a method to strongly glue a photocatalyst onto a substrate by providing a specific adhesive layer in between a photocatalyst layer and a substrate to thereby protect the substrate provided under the adhesive layer from its deterioration due to photocatalytic action derived from the photocatalyst and strongly glue the photocatalyst layer to the substrate and by making the adhesive layer resistant to deterioration due to photocatalytic action, providing a solution for the problems as described above.

DISCLOSURE OF INVENTION

The inventors of the present invention found that silicon-modified resin, such as acryl-silicon resin or epoxy-silicon resin, containing 2–60% by weight of silicon, a resin containing 5–40% by weight of colloidal silica, and a resin containing 3–60% by weight of polysiloxane, which is a polycondensation reaction product of a compound represented by a general formula (1);

$$SiCl_{n_1}(OH)_{n_2}R^1_{n_3}(OR^2)_{n_4} \quad (1)$$

wherein $R^1$ is an alkyl having 1–8 carbon atoms which is unsubstituted or substituted with any of amino, carboxyl or chlorine atom, $R^2$ is an alkyl having 1–8 carbon atoms or an alkoxy-substituted alkyl having 1–8 carbon atoms, $n^1$ is 0, 1 or 2, $n^2$ and $n^3$ are each independently 0 or any of integers of from 1 to 3, $n^4$ is any of integers of from 2 to 4, provided the sum of $n^1$, $n^2$, $n^3$ and $n^4$ is 4, can strongly glue a photocatalyst and protect the substrate from photocatalytic action derived from a photocatalyst.

Moreover, for solving the problem on the photocatalyst coating material, the inventors of the present invention have found out that a photocatalyst coating material comprising 0.001–5% by weight of one or more of alkoxysilanes represented by a general formula (2);

$$SiR^3_{n_5}(OR^4)_{4-n_5} \quad (2)$$

wherein $R^3$ is an alkyl having 1–8 carbon atoms which is unsubstituted or substituted with any of amino, chlorine atom or carboxyl, $R^4$ is an alkyl having 1–8 carbon atoms or an alkoxy-substituted alkyl having 1–8 carbon atoms, $n_5$ is 0, 1 or 2, or the hydrolysis products thereof, 1–30% by weight of a metal oxide sol and/or a metal hydroxide sol on the solid component basis, and 0.1–30% by weight of a photocatalyst in powder and/or sol, can be stable for a long time and does not result viscosity increase and particle sedimentaion, and they have accordingly accomplished the present invention.

Furthermore, the inventors of the present invention have also found out that the photocatalyst-carrying structure and the photocatalyst coating material described above can be carried onto various substrates, such as glass, plastics, metals, cloth and woody materials, and can be coated onto lens, adhesive films, window shades, nonwoven fabrics, wooden doors, etc. by using the photocatalyst coating material according to the present invention.

The present invention is further described in detail in the following.

In the present invention, a resin to be used for forming the adhesive layer in the photocatalyst-carrying structure is selected from a group consisting of silicon-modified resin, such as acryl-silicon resin or epoxy-silicon resin, comprising 2–60% by weight of silicon, a resin comprising 5–40% by weight of colloidal silica and a resin comprising 3–60% by weight of polysiloxane.

When any of silicon-modified resin containing silicon at content of less than 2% by weight, such as acryl-silicon resin, a resin containing polysiloxane at a content of less than 3% by weight and a resin containing colloidal silica at content of less than 5% by weight is used, the binding force between the adhesive layer and the photocatalyst layer degrades, and the adhesive layer is deteriorated due to the action of a photocatalyst, thereby the photocatalyst layer tends to be exfoliated easily. Whereas, when silicon-modified resin, such as acryl-silicon resin containing silicon at a content more than 60% by weight is used, the binding between the adhesive layer and the substrate gets worth and the abrasion-resistant property of the structure degrades because of the lowering of the hardness of the adhesive layer.

Whereas, when a resin containing polysiloxane more than 60% by weight or a resin containing colloidal silica more than 40% by weight is used, the adhesive layer becomes porous, the substrate provided under the adhesive layer deteriorates due to the effect of a photocatalyst, and binding condition between the substrate and the adhesive layer degrades, and the photocatalyst layer thereby tends to be easily exfoliated from the substrate.

When using silicon-modified resin, such as acryl-silicon resin and epoxy-silicon resin, as an adhesive layer material, any silicon-modified resin prepared according to any method for introducing silicon into resin, such as an ester exchange method, graft reaction method using silicon macromers and reactive silicon monomers, hydrosilylation reaction method and block copolymerization method, can be used in the present invention.

As a resin whereto silicon is introduced, acryl resin and epoxy resin are the most suitable in terms of film-forming property, toughness and adhesion property to the substrate, howeverr, other resins, such as alkyd resin, urethane resin and polyester resin, can be used as well. In addition, these resins can be used in the either type of solution or emulsion. Also, it is not problematic even though such resin contains an additive, such as a cross-linking agent.

A photocatalyst-carrying structure with improved adhesive property and durability can be obtained if a resin used for forming an adhesive layer is polysiloxane, and the polysiloxane is a hydrolysis product of a silicon alkoxide having 1–5 carbon atoms or a product derived from such a hydrolysis product. If alkoxy group of the silicon alkoxide contains 6 or more carbon atoms, such resin becomes costly, and the adhesive property and durability of the resin deteriorate because it is difficult to harden the alkoxide in the resin due to its slow hydrolysis rate.

It is also possible to use polysiloxane which is obtained by subjecting silicon alkoxide partially containing chlorine to hydrolysis, however, a substrate may result corrosion due to the presence of chlorine ions as an impurity when using polysiloxane containing a high degree of chlorine atoms, which also degrades the adhesive property of the adhesive layer.

As a method to introduce polysiloxane into a resin, a method to mix it in a form of a silicon alkoxide monomer with a resin solution and subsequently allowing it to hydrolysis with moisture in the air at the time of forming an adhesive layer, a method to mix a product obtained by partially allowing silicon alkoxide to hydrolysis with a resin and subsequently allowing the mixture to hydrolysis with moisture in the air at the time of forming a protective film, etc. are known, any method which allows an uniform mixing with a resin can be employed. A small amount of an acid or base catalyst may be added to change the speed of hydrolysis of silicon alkoxide.

As examples for a resin suitable to be introduced with polysiloxane, acryl resin, acryl-silicon resin, epoxy-silicon resin, silicon-modified resin, urethane resin, epoxy resin, polyester resin, alkyd resin, etc. can be given, however, silicon-modified resin including acryl-silicon resin and epoxy-silicon resin are the most preferable one in view of their durability property.

If the adhesive layer is composed of a resin that contains colloidal silica, it is preferable if the diameter of colloidal silica particles is 10 nm or less. When the diameter exceeds 10 nm, the resin in the adhesive layer further deteriorates due to the influence of a photocatalyst, and binding condition between the photocatalyst layer and the adhesive layer become worse as well. As a method to introduce such colloidal silica into the resin, it is known that a method to mix a resin solution with a colloidal silica solution, then apply it and subsequently dry it to form an adhesive layer is the easiest, however, a method to form an adhesive layer by allowing a resin to polymerization while dispersing colloidal silica in the resin and then to apply the synthesized resin and dry it, is also acceptable. It is also possible to use colloidal silica after treating it with a silane coupler for improving adhesive property and dispersibity of colloidal silica and a resin.

As examples for a resin whereto colloidal silica is introduced, acryl resin, acryl-silicon resin, epoxy-silicon resin, silicon-modified resin, urethane resin, epoxy resin, polyester resin, alkyd resin, etc. are given, however, silicon-modified resins including acryl-silicon resin and epoxy-silicon resin, are the most suitable one in term of durability.

As the colloidal silica, any silica sol, which is produced either by subjecting sodium silicate solution to cation exchange or by subjecting silicon alkoxide to hydrolysis, can be used.

Whereas, for a purpose to prevent deterioration of a resin used for an adhesive layer by influence of a photocatalyst and to improve its durability, a mixing of the resin with a photostabilizing agent and/or an ultraviolet absorbent or the like may provide a good effect. As usable photostabilizing agents, it is preferable to use hindered amine compounds, however, any other compounds can be used as well. Whereas, triazole compounds can be used as an ultraviolet absorbent. The amount of the ultraviolet absorbent to be added to the resin is in a range of from 0.005% by weight to 10% by weight based on the weight of the resin, and more preferably from 0.01% by weight to 5% by weight. By treating the surface of the adhesive layer with a silane-containing or titan-containing coupler, the binding condition between the adhesive layer and the photocatalyst layer may be improved.

As a method to carry an adhesive layer on a substrate, a method to coat the substrate with a resin solution according to any of printing method, sheet molding method, spray blowing method, dipping and coating method, spin coating method, etc. and then to dry the coated-substrate gcan be employed. The temperature for drying the coated-substrate is preferably at 150° C. or less, though it differs depending on type of solvents and resins. When a thickness of an adhesive layer is 0.1 $\mu$m or more, it is possible to prepare a photocatalyst-carrying structure which can strongly bind a photocatalyst layer and a substrate and has high durability. Whereas, in case of a coating method, such as gravure method, which requires a process for drying and curing the adhesive layer in a short time, it is also allowable to add a curing agent, such as silicon compounds or the like, into the adhesive layer material from 0.1 to 10% by weight based on the weight of the solid component of the adhesive layer material, depending upon hardening speed required.

A metal oxide gel or a metal hydroxide gel presenting in a photocatalyst layer provides an effect to fix photocatalyst powder and to strongly adhere it to an adhesive layer, and therefore, a photocatalyst-carrying structure comprising such metal oxide gel and/or metal hydroxide gel show excellent adhesibity, durability and weather resistance as shown in the examples of the embodiment for the present invention. In addition, such metal oxide gel and metal hydroxide gel have porous structure and are adsorbate, and they have further an effect to enhance photocatalytic activity. A preferable range for the content of such metal oxide gel or metal hydroxide gel in the photocatalyst layer is from 25 to 95% by weight. When this content is less than 25% by weight, the binding with an adhesive layer may be insufficient, whereas photocatalytic activity may be insufficient when that content exceeds 95% by weight.

Furthermore, the binding described above and the photocatalytic activity can be improved, when the specific surface area of the metal oxide gel or the metal hydroxide gel after drying at 150° C. is 50 m$^2$/g or more, and more preferably 100 m$^2$/g or more.

As examples for a metal in the metal oxide gel and the metal hydroxide gel as described above, silicon, aluminium, titanium, zirconium, magnesium, niobium, tantalum, tungsten, tin, etc. are given.

The sticking property of a photocatalyst layer after dipping it into boiling water can be improved by using a metal oxide gel or a metal hydroxide gel comprising 2 or more metals selected from a group consisting of silicon, aluminium, titanium, zirconium and niobium. As examples for a combination of metal components showing boiling water resistance, silicon-aluminium, silicon-titanium, silicon-zirconium, silicon-niobium, aluminium-titanium, aluminium-zirconium, aluminium-niobium, aluminium-tantalum, titanium-zirconium, titanium-niobium, titanium-tantalum, silicon-aluminium-zirconium and silicon-aluminium-titanium are given as preferable, and metal oxide gels and metal hydroxide gels comprising metals, such as silicon-aluminium, silicon-titanium, silicon-zirconium, silicon-titanium-aluminium and silicon-aluminium-zirconium are given as more preferable ones.

If the specific surface area of these metal oxide gels or metal hydroxide gels is 50 $m^2/g$ or more, they provide high sticking property and improved photocatalytic activity to a photocatalyst layer, thereby allowing the photocatalyst-carrying structure to retain excellent binding property even after dipping it into boiling water. In practical uses, both gels prepared by mixing a sol for forming a gel and complex oxide gels prepared by coprecipitation method or the like may be used. For mixing with a photocatalyst, it is desirable either to uniformly mix a metal oxide or hydroxide in a state of sol before forming gel or to mix in a stage of a raw material before preparing a sol.

As a method to prepare gels, a method to hydrolyze a metal salt, a method to decompose a metal salt by neutralization, a method to exchange ions, a method to hydrolyze a metal alkoxide, and the like can be given, however, any methods by which the gel is obtained in a state that photocatalyst be uniformly dispersed in the gel, are allowable to use. Provided, as the sticking property and the photocatalytic activity of a photocatalyst may be affected if plenty of impurities are contained in the gel, it is preferable to use a gel containing less impurities.

Further, by adding either of silicon-modified resin or a silane coupler into a photocatalyst layer from 10 to 50% by weight, it is possible to obtain a photocatalyst layer which retains high photocatalytic activity and has an excellent binding property evaluated as more than 6 points according to the adhesive property test, cross-cut Scotch tape test provided in JIS-K5400 even after dipping it into boiling water for 15 minutes.

The silicon-modified resin or a silane coupler to be added into a photocatalyst layer has an effect to improve the adhesive property of the photocatalyst layer to a substrate in boiling water. As the silicon-modified resin, commonly available resins, such as silicon-acryl resin and silicon-epoxy resin, either in a state of solution in a solvent or suspension in water are usable. Whereas, as the silane coupler, a compound represented by general formulas, $RSi(Y)_3$ and $(R)_2Si(Y)_2$, wherein R is an organic functional group and Y is chlorine atom or alkoxy, and the like are usable. In the general formulas described above, methyl, ethyl, vinyl, γ-glycidoxypropyl, γ-methacryloxypropyl, γ-(2-aminoethyl)aminopropyl, γ-chloropropyl, γ-mercaptopropyl, γ-aminopropyl, and γ-acryloxypropyl, etc. are given as the examples for a substituent represented by R, and in addition to chlorine atom, any of $C_1$–$C_5$ alkoxy, such as methoxy, ethoxy, β-methoxyethoxy and β-ethoxyethoxy, are also usable as a substituent represented by Y.

The amount of silicon-modified resin and a silane coupler to be added to a photocatalyst layer is preferably from 10 to 50% by weight on the solid component basis. If the such amount is less than 10% by weight, binding property after allowing the layer to boiling water test will be reduced, whereas the added-amount exceeds 50% by weight, remarkable decrease in photocatalytic activity may be caused. As the method to add either the silicon-modified resin or the silane coupler into a photocatalyst layer, a method to add such resin into a photocatalyst in a state of either powder or sol and a method to add them into either a metal oxide sol or a metal hydroxide sol which are used for forming a metal oxide gel and added with a photocatalyst. The addition of silicon-modified resin in emulsion to the sol described above is particularly preferable, since it can improve binding property of a photocatalyst layer in boiling water with nearly no deacrease of photocatalytic activity.

Also, an additive, such as a cross-linking agent, can be combined into the silicon-modified resin or the silane coupler.

As the photocatalyst of the present invention, any type thereof, such as in powder form, sol and solution, can be usable if it can bind with an adhesive layer and show the photocatalytic activity, when it has been dried at a drying temperature for the photocatalyst layer. When a photocatalyst in a sol state is used, it is preferable to use the one of which particle diameter is 20 nm or less, and more preferably 10 nm or less, because the transparency of a photocatalytic layer may be improved and linear permeability thereof increases, and therefore, it is especially preferable to use such photocatalyst for coating of glass substrates and plastic moldings, which are required to be transparent. Furthermore, if color and/or patterns are applied on an underlying substrate, a transparent photocatalyst layer coated with such photocatalyst is advantageous because it does not give adverse influence to colors and/or patterns on the underlying substrates.

As the photocatalyst to be used for the photocatalyst layer according to the present invention, $TiO_2$, $ZnO$, $SrTiO_3$, $CdS$, $GaP$, $InP$, $GaAs$, $BaTiO_3$, $KNbO_3$, $Fe_2O_3$, $Ta_2O_5$, $WO_3$, $SnO_2$, $Bi_2O_3$, $NiO$, $Cu_2O$, $SiC$, $SiO_2$, $MoS_2$, $InPb$, $RuO_2$, $CeO_2$ and the like, and mixtures of these photocatalysts with a metal or a metal oxide, such as Pt, Rh, $RuO_2$, Nb, Cu, Sn, Ni and Fe, can be used. In addition thereto, all mixtures prepared by adding a metal, such as Pt, Rh, $RuO_2$, Nb, Cu, Sn, Ni and Fe, into the photocatalyst by using photocatalyst reduction reaction, are also applicable in the present invention. The photocatalytic activity increases along with the increase of content of a photocatalyst in the photocatalyst layer, howeveer, it is preferable to maintain the content to 75% by weight or less in view of maintaining sufficient binding property.

The photocatalyst coating material according to the present invention is characterized in that the solution comprises silicon compound 0.001–5% by weight, a metal oxide sol and/or a metal hydroxide sol 0.1–30% by weight on the solid component basis and a photocatalyst powder and/or sol 0.1–30% by weight on the solid component basis.

As the examples for the silicon compounds added to the photocatalyst coating material of the present invention, alkoxy silane represented by a general formula (2), $$SiR^3{}_{n_5}(OR^4)_{4-n_5} \quad (2)$$

wherein $R^3$ is unsubstituted or substituted alkyl having 1–8 carbon atoms with amino, chlorine atom or caboxyl, $R^4$ is an alkyl having 1–8 carbon atoms substituted with alkyl having 1–8 carbon atoms or alkoxy, and $n_5$ is any of 0, 1, 2 and 3, and the mixtures with one or more of those hydrolyzed products can be used. In the general formula (2), methyl, ethyl, vinyl, γ-glycidoxypropyl, γ-methacryloxypropyl, γ-(2-aminoethyl)aminopropyl, γ-chloropropyl, γ-mercaptopropyl, γ-aminopropyl, γ-acryloxypropyl and the like are given as the example for the substituent represented by $R^3$, and $C_1$–$C_8$ alkoxy, such as methoxy, ethoxy, n-propoxy, i-propoxy, n-butoxy, β-ethoxyethoxy and 2-ethylhexyloxy, are preferable as examples for the substituent represented by —$OR^4$. As the example for the silicon compounds represented by the general formula (2), tetramethoxy silane, tetraethoxy silane, methyltrimethoxy silane, methyltriethoxy silane, and mixtures consisting of one or more hydrolysis products of those compounds mentioned hereinabove can be preferably given.

By adding a small amount of the silicon compound described above into a coating soluiton for forming a photocatalyst layer, stable coating material for forming a photocatalyst layer which results in a less increase of viscosity and particles sedimentation even preserving it for a long time can be obtained. As to the amount of the silicon compound to be added to the coating material for forming a photocatalyst layer, it is preferable to add it from 0.001 to 5% by weight on the solid component basis. When the such amount is less than 0.001% by weight, the stability of the coating material for forming a photocatalyst layer becomes lowered when it is preserved for a long time, whereas a prominent decrease in photocatalytic acitivity will be caused when such amount to add is more than 5% by weight. As a method to add a silicon compound into a coating material for forming a photocatalyst layer, a method to add it into a solution of a photocatalyst in the either form of powder or sol, a method to add it into sol of either a metal oxide or a metal hydroxide, which are added together with a photocatalyst, and the like can be employed. Alternatively, partly-hydrolyzed silicon compounds may be added into the coating material. As the silicon compound to be added into the coating material for forming a photocatalyst layer has an effect to increase the binding property of a photocatalyst in boiling water, it is possible to reduce an amount of the silicon compound to add when the silane coupler as described above or the like has been added into the coating material.

It is preferable to add a metal oxide sol and/or a metal hydroxide sol 0.1–30% by weight and photocatalyst powder and/or sol 0.1–30% by weight on the solid component basis relative to the weight of the coating material for forming a photocatalyst layer, respectively, into the said coating solution.

If a ratio of amount of the metal oxide sol and/or the metal hydroxide sol to add is less than 0.1% by weight, property to bind a photocatalyst to a substrate will be insufficient, whereas if the such rate is more than 30% by weight, the amount of photocatalyst powder and/or sol added concurrently is obliged to be reduced, thereby photocatalytic activity will be lowered. Whereas, photocatalytic activity will be too low if a ratio of amount of the photocatalyst powder and/or sol to add is less than 0.1% by weight, and a photocatalyst layer will be easily exfoliated since the amount of a metal oxide sol and/or a metal hydroxide sol for binding the layer to a substrate is obliged to be reduced if a ratio of amount of the photocatalyst powder and/or sol to add is 30% by weight or more.

The coating material for forming a photocatalyst layer according to the present invention is concurrently used with a coating material for forming an adhesive layer, with which an adhesive layer can be formed in between a photocatalyst layer and a substrate. As the coating material for forming an adhesive layer, a composition which contains from 1 to 50% by weight on the solid components basis a silicon-modified resin containing 2–60% by weight of silicon, a resin containing 3–60% by weight of polysiloxane and a resin containing 5–40% by weight of colloidal silica can be used.

As a resin suitable to be used for a coating composition for forming an adhesive layer, it is preferable to use the resins usable for an adhesive layer as described above, by alone or in a mixture with any other one of such resins. Such a coating composition is then preferable to be prepared either in solution of an organic solvent or in aqueous emulsion and the content of the resin as a solid element is preferably selected from 1 to 50% by weight. When a coating composition wherein the concentration of solid content of such resin is 1% or less, the adhesive layer is formed too thin and the binding of the photocatalyst layer will be difficult to make. Whereas, when a coating composition wherein the concentration of the solid content of such resin is 50% or more, the adhesive layer will be formed too thick and it will be difficult to properly make a coating film and handle such a coating composition because it will get too much viscous.

When forming a photocatalyst layer on an adhesive layer, a suspension wherein a photocatalyst is dispersed in a sol of either a metal oxide or a metal hydroxide can be applied by coating according to a method which is the same as the one for forming an adhesive layer. Alternatively, a photocatalyst can be dispersed in a solution of a precurser of either a metal oxide sol or a metal hydroxide sol and is then prepared to a form of either sol or gel through a process of hydrolysis or neutralizing decomposition at the coating process. When the sol prepared as described above is used, a deflocculant, such as an acid and an alkali, may be added for improving stability of the sol. Also, it is possible to further improve the adhesive property and easiness in handling by adding a surfactant, silane coupler or the like into the sol 5% by weight or less based on the weight of a photocatalyst. Drying temperature at the time that a photocatalyst layer is formed is preferably from 50 to 200° C., though it differs depending upon the difference in substrates and resin materials used for the adhesive layer.

Though a thicker photocatalyst layer provides higher photocatalytic activity, there is no big difference in the activity if the thickness exceeds 5 μm. The photocatalyst layer of which thickness is 5 μm or less is preferable because it provides high photocatalytic activity and light transmitting property that makes the adhesive layer less conspicuous. However, though light transmitting property is improved in case that a thickness of the photocatalyst layer is less than 0.1 μm, it is not expectable to obtain high photocatalytic activity since ultraviolet ray that can be utilized by a photocatalyst is also penetrated through the photocatalyst layer. Whole light transmittance in total of a photocatalyst layer and an adhesive layer at a wave length of 550 nm will be 70% or more, if a thickness of the photocatalyst layer is set to a range of from 0.1 $\mu$m to 5 $\mu$m and a photocatalyst of which particles having a diameter of 40 nm or less and either a matal oxide gel or a metal hydroxide gel of which specific surface area is 100 $m^2/g$ or more are used. In case of a photocatalyst-carrying structure of which whole light transmittance at a wavelength of 550 nm is 70% or more, visible light penetrating through the structure can be used for illumination, whereas such structure will be useful from the ornamental view point as it does not spoil a design on a substrate if the substrate of such structure is opaque.

The substrate can be formed in any complex shapes, such as film-like, plate-shaped, tubular, fiber-like and reticular, and the adhesive layer and the photocatalyst layer can be provided to any of the such substrate to thereby form a desired photocatalyst-carrying structure. As to the size of the substrate, it can carry both the adhesive layer and the photocatalyst layer if it has a size of 10 $\mu$m or more. Even an organic polymer which is not allowable to be heated at the time of coating and a metal which is easily oxidized and corrosive by heating or with water are used for the materials for the substrate, it is possible to prepare a structure whereto an adhesive layer and a photocatalyst layer are provided, which may show both high photocatalytic activity and high durability. In order to improve the close adherence between a substrate and an adhesive layer, a substrate of which surface is subjected to discharging process, primer process and the like can be used as well.

As indicated in the examples described below in this specification, the photocatalyst-carrying structure according to the present invention is useful for paints for architectural use, wall papers, window glass, blinds, curtains, carpets, illumination appliances, lightings, black lights, paints for a ship bottom and fishing nets, fillers for water treatment, vinylchloride films for agricultural use, sheets for preventing growth of weeds, packaging materials, etc. In addition, the photocatalyst-carrying structure can be made to a structure which is usable under a high temperature and highly humid condition.

According to the present invention, it is possible to provide a structure carrying an adhesive layer and a photocatalyst layer having high durable property being expressed as an evaluating point of 6 or more in an adhesive property test according to a method called cross-cut Scotch tape test provied in JIS K5400 even after exposing it to black light having an ultraviolet radiation intensity of 3 $mW/cm^2$ for 500 hours at 40° C. and 90% R.H. Additionally, in an accelerated weathering test by using Sunshine weather meter, a phtocatalyst-carrying structure able to show such a excellent weathering resistance being expressed as an evaluating point of 6 or more in an adhesive property test for 500 hours according to said cross-cut Scotch tape test provided in JIS K5400 has been obtained. Furthermore, a structure which shows high resistance to boiling water such that the adhesive property of the structure evaluated by cross-cut Scotch tape test provided in JIS K5400 after dipping in boiling water having an electric conductivity of 200 $\mu$S/cm at 20° C. for 15 min. is expressed as an evaluating point of 6 or more. Since high photocatalytic activity is observed in any samples of the structures, it is understood that the structure according to the present invention has satisfactory properties with regard to various uses as described above.

When a substrate is made of glass, the glass can be formed in any complex shapes, such as plate-shaped, tubular, ballshaped and fiber-like, and is provided with said adhesive layer and said photocatalyst layer. As to the size, such glass can carry firmly if it is 10 $\mu$m or more in size. Moreover, depending upon its usages for, such as window glass, show cases and glasses, it is also possible to apply such layers to the processed glass to thereby make a photocatalyst-carrying glass according to the present invention.

The photocatalyst-carrying glass according to the present invention can be used for various items which require antimicrobial, deodorant and antisoiling effect, such as cameras and lens for glasses, as well as window glass, cover glass for instruments, illumination appliances, lightings, black light blue fluorescent lamps and fillers for water treatment.

A plastic molding carrying a photocatalyst according to the present invention can be used for various uses which require antimicrobial, deodorant and antisoiling effect, such as cameras and lens for glasses, as well as wall papers, board for interior decoration, furnishings, electric appliances, and parts for carriages.

Regarding the shape of the plastic molding described above, any complex shapes, such as film-like, plate-shaped, tubular, ball-shaped and fiber-like, can be used for manufacturing a structure made of plastic molding provided with said adhesive layer and said photocatalyst layer. As to the size, such plastic moldings can carry such layers firmly if its size is 10 $\mu$m or more. Furthermore, depending upon the usages, such as for construction materials, electric appliances for home use and glasses, it is also possible to apply such layers to the plastic molding to thereby manufature a photocatalyst-carrying plastic molding according to the present invention, and therefore, it is understood that the structure of the present invention has substantially a wide application range for use.

Many kinds of cloth can be used for the substrate of the present invention; textiles, knit cloth, and nonwoven fabrics comprising single or mixed fibers consisting of natural fibers, such as wool, silk, cotton and hemp yarn, regenerated fibers, such as rayon and acetate, synthetic fibers, such as nylon, acryl, polyamide, polyester, polyacrylnitrile and polyvinyl chloride, and heat-resistant fibers, such as aramid fibers, are given as the examples. Also, as the structure of the present invention, a cloth applied with a water repelent, such as silicon-containing water repelent, fluorine-containing water repelent including perfluoroalkyl acrylate, zirconium salt-containing water repelent and ethylene urea-containing water repelent, a cloth treated with both water repelent and a cross-linking agent, such as ethylene imine, epoxy and melamine compounds, for improving durability, if appropriate, an imitation leather consisting of fibril-formed complex fiber of polyamide and polyester, and a synthetic leather wherein a polyurethane resin layer is formed on a substrate, such as textile, nonwoven fabric and knit cloth, via a binder made of polyurethane. Also, by applying such a water repelent and the like to clothes being processed to umbrellas, tents, bags, etc., the photocatalyst-carrying clothes according to the present invention can be obtained.

The photocatalyst-carrying cloth specified in the present invention is applicable for various uses which require antimicrobial, deodrant and soiling resistant effect, for example, interior decoration, such as curtains and wall papers, tents, umbrellas, daily necessities like table cloth, food package materials and the like, and agricultural use, such as sheets for seedling beds.

For the photocatalyst-carrying metal according to the present invention, an alloy, such as stainless steel, brass, aluminium alloy and titan alloy, can be used as a substrate as well as single-element metals, such as aluminium, iron and copper. Additionally, in case that it is allowable from the configuration and quality point of view of a metal to use, it is also possible to carry both an adhesive layer and a photocatalyst layer according to the present invention onto the substrate, such as a metal sheet and plate painted with normal colorings, and a colored steel plate or aluminium plate. In this case, it is further preferable that, if the light transmittance of both adhesive layer and photocatalyst layer is sufficiently high and transparent, such layers do not give bad influence to the color on the underlying substrate.

As to the configuration of the metal, there is no difficulty to make the configuration of the metal into any complex shape, such as plate-shaped, tubular, ball-shaped, fiber-like and sheet-shaped, to carry such adhesive layer and photocatalyst layer thereon. And, the metal can carry such layers firmly if the size thereof is 10 $\mu$m or larger. Furthermore, depending upon the usages, for example, for window flames, show cases and flames for glasses, all of which have been processed, the photocatalyst-carrying metal according to the present invention can be manufactured by applying such layers to the metals having been processed.

The photocatalyst-carrying metal according to the present invention can be used for various uses which require antimicrobial, deodrant and soiling resistant effect, for example, strainers, filters and the like as well as window flames, furnishings, accessories and decoration, panels for interior and exterior decoration, fillers for water treatment, etc.

As to the configuration of timbers and woody materials whereto the adhesive layer and the photocatalyst layer according to the present invention are provided, any complex configuration, such as plate-like, tubular, ball-shaped and sheet-like, can be employed. Such timbers or woody materials can sufficiently carry such layers thereon if their size are 10 $\mu$m or larger, and it is allowable to manufacture a photocatalyst-carrying timber or woody material according to the present invention by applying such layers onto the such timber and woody material, such as walls, ceiling boards, columns, furnishings and woodworks, which have been processed beforehand.

The timber and woody material carrying a photocatalyst according to the present invention can be applied for various uses which require antimicrobial, deodrant and soiling resistant effect, for example, for construction materials, furnishings, woodworks, and materials for interior decoration.

By taking advantageous properties, such as soiling resistant, antimicrobial and deodrant function, a plastic film provided with the photocatalyst-carrying structure according to the present invention can be made as films of which face, whereto a photocatalyst is not carried, is applied with an adhesive, and such films can be applied to the inner face of window glass of a structure, such as cars and various transportation means, buildings, freezing and cooling show cases and greenhouses, thereby with such glass allowing to provide highly-transmissible glass which expedites decomposition of trace harmful substance existing in the inner space and has soiling resistant effect on a glass surface and preventive effect to glass spattering at its destruction. When the photocatalyst-carrying structure according to the present invention is prepared by using a thin plastic film as a substrate, it can be used as a wrap film for food package use. As a resin applicable for such plastic films, a resin, such as polyethylene-telephthalate resin, polycarbonate resin, polyacrylate ester resin, polymethylmethacrylate resin, polyethylene resin, polypropylene resin, polyamide resin, polyimide resin, polystyrene resin, poly(vinyl chloride) resin, poly (vinylidene fluoride) resin, ethylene fluoride-propylene copolymer resin and ethylene fluoride-ethylene copolymer resin, which can be molded into a highly transmissive synthetic resin film or sheet of which linear light transmittance at a wavelength of 550 nm is 50% or more can be used. Furthermore, since the photocatalyst-carrying structure according to the present invention is transparent, it does not give bad influence on design and patterns printed on the surface of the underlying wall papers and decoration sheets so that the photocatalyst layer can be applied advantageously onto the surface of an opaque material, such as wall papers and decoration sheets, provided with an adhesive layer and a detachable film layer on its background.

In these synthetic resin films or sheets described above, it is possible to improve the adhesive property of the adhesive layer in the photocatalyst-carrying structure by treating the surface of such films and the sheets, of which surface whereto an adhesive layer is applied, are physically subjected to trace amount oxidization by corona discharge treatment and UV-ozone treatment and the ones of which contact with an adhesive layer are improved by slight application of a surface treating agent, such as silicon-containing compounds, can be used advantageously.

In addition, as shown in the examples for the embodiment of the present invention, it is also possible to fix a thin film on the surface or the background of such materials for providing reflecting and shading function against thermic rays and ultraviolet ray, thereby thermic rays reflecting films and ultraviolet ray interrupting films concurrently having soiling resistant, antimicrobial and deodorant function become obtainable. It is understood that the photocatalyst-carrying structure according to the present invention has both excellently high durability and photocatalytic activity, and therefore, it could be exceedingly useful and valuable product.

As a method to provide the thermic rays reflecting function described above, various methods, such as a method to form a film onto a film surface with an electroconductive metal, such as Al, Ag, Cu, Cr, Ni, Ti, stainless and aluminium alloy, or an electroconductive metal oxide, such as indium oxide, tin oxide and tin oxide-indium oxide compound, according to a physical means, such as sputtering and vacuum evaporation, a method to form a film onto a film surface by means of applying and then drying an electroconductive metal oxide soluiton or sol onto the film surface or employing either plating method or CVD method and a method to admix a material having thermic rays reflecting property and/or thermic rays interrupting property into the substrate, can be employed. Yet, as a method to provide ultraviolet ray interrupting function, various methods, such as a method to form a film onto a film surface by applying an ultraviolet ray absorbent, such as hindered amine-containing compounds and titanium oxide, and an ultraviolet ray reflecting agent and a method to admix an ultraviolet ray absorbent into a film substrate beforehand, are allowed to employ and is selectable depending upon its use purpose and chemical structures. When titanium dioxide is used as ultraviolet ray blocker or ultraviolet ray reflecting agent, it is preferable to use the one which has lost its photocatalytic activity due to slight coating of the surface of titatium dioxide with soluble glass or the like, because surrounding organic materials are decomposed due to photocatalytic action if titanium dioxide is existing alone, as explained in detail in the present invention.

Materials having thermic rays reflecting function and ultraviolet ray blocking function can be incorporated into a sticker layer which is formed on the background of a film to provide such functions. For example, a material like ultraviolet blocking clear coating agent described in "Convertec", March 1996, page 95, is solvent-dispersible type and is applicable for the above purpose. Stickers, such as acryl-type and silicon-containing compounds are normally used, however, it is also feasible to add various types of ultraviolet ray blocking agents and thermic rays blocking agents. Considering spoil caused with the remainning sticker at the time of renewal the photocatalyst carrying film, it is advisable to avoid the use of a sticker having strong binding property. As a method to provide a sticker and a detachable film onto a photocatalyst-carrying film, a method to firstly coat a sticker in solution to the reverse side of the film by means of gravure printing and then dry and roll the coated-film together with detachable polypropylene film while laminating it therewith is simple and may be preferably employed.

BEST MODE FOR CARRYING OUT THE INVENTION

Figure 1:
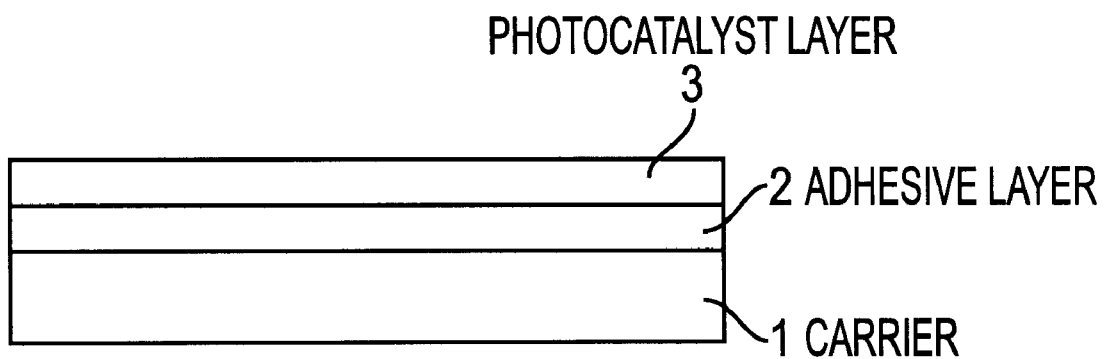
FIG. 1 is a chart for the cross section of the photocatalyst-carrying structure according to the present invention.

The present invention is definitely explained with referring the examples described below, however, the present invention should not be limited to the scope described in such examples.

Evaluation Method

1) Evaluation of Photocatalytic Activity

A sample carrying a photocatalyst with a dimension of 70 mm×70 mm is placed in a 4-liters Pyrex glass container. A mixed gas consisting of air and acetaldehyde was introduced in this container and the concentration of the acetaldehyde was set to 500 ppm. The sample was exposed to black light (Type: FL 15BL-B; Manufactured by Matsushita Electric Industry Co., Ltd.) with an ultraviolet ray intensity of 2 mW/cm$^2$ for 2 hours. Then, a concentration of acetaldehyde gas in the container was determined by using gas chromatography, and photocatalytic activity was determined based on the decreased amount of the concentration. Criterion for the evaluation was provided as follows.

| Acetaldehyde Gas Concentration after 2 Hours | Evaluated Rank |
| --- | --- |
| <50 ppm | A |
| 50–200 ppm | B |
| 200–300 ppm | C |
| 300–450 ppm | D |
| 450 ppm< | E |

2) Evaluation of Adhesive Property

Evaluation of adhesive property was carried out according to cross-cut Scotch tape test which is provided in JIS K 5400. A distance between cross-cut lines set to 2 mm, and the number of squares is fixed to 25. Evaluated point was accorded to a criterion described in JIS K 5400.

3) Dipping Test into Boiling Water

Tap water with an electric conductivity ranging from 170 to 230 μS/cm was placed into a 1000 ml Pyrex glass beaker together with small amount of zeolite, the sample cut into a size of 70 mm×70 mm was hanged into boiling water by using a normal clip to let the whole sample sink into water after heating and boiling water. After 15 min. dipping in boiling water, the sample was allowed to cooling and drying at a room temperature for 4 hours, then the adhesive property test described in the paragraph 2) was conducted to obtain evaluated-points according to the criterion described in JIS K 5400.

4) Whole Light Transmittance

Whole ligt transmittance at a wavelength of 550 nm of the sample carrying an adhesive layer and a photocatalyst layer was measured by using an automatically-recording spectrophotometer (Type: U-4000, Manufactured by Hitachi Seisakusho) with referring a substrate which has not yet carried an adhesive layer and a photocatalyst layer.

5) Evaluation of Durability

The carrying sample was allowed to radiation of black light with an ultraviolet ray intensity of 3 mW/cm$^2$ for 500 hours in a chamber maintained at 40° C. and 90% R.H., then the adhesive property test described in the paragraph 2) was conducted to obtain evaluated-points according to the criterion described in JIS K 5400.

6) Accelerated Weathering Test by Using Sunshine Carbon Arc Weather Meter

Accelerated weathering test by using sunshine carbon arc weather meter provided in JIS K 5400 was conducted by using the same meter (Type: WEL-SUN-HCH; Manufactured by Suga Shikenki Co., Ltd.) at a condition, namely, test duration of 500 hours, black panel temperature of 63° C., 120 min. cycle and 18 min. rainfall. 3 pieces of the samples were allowed to the accelerated weathering test, then the samples were visually evaluated in terms of swelling, cracking, peeling off, whitening and surface change in comparison with the original test pieces which are before subjecting it to the accelerated weathering test according to the following criterion.

| Evaluated-rank | Criterion for Evaluation |
| --- | --- |
| A | All of 3 samples showed no change. |
| B | 1 or 2 samples showed slight change. |
| C | All of 3 samples showed slight change, or 1 or 2 samples showed apparently great change. |

After conducting this test, the adhesive property test as described in the paragraph 2) was then conducted to obtain evaluated-points according to a criterion described in JIS K 5400.

7) Test Method for Antimicrobial Property

The sample cut into a piece with a dimension of 5×5 cm is disinfected with 80% ethanol and then dried at 150° C., and 0.2 ml of a bacterial suspension of colon bacillus, which was cultivated and diluted beforehand, to a concentration of $10^5$/ml was fed dropwise to the surface of the sample and placed in an incubator. For each radiation condition, 4 samples were provided for the test, respectively, namely, 4 samples for black light radiation (15 W×2 lamps, distance between a light source and the sample is 10 cm), 4 samples for flourescent lamp radiation (15 W×2 lamps, distance between a light source and the sample is 10 cm), and another 4 samples for no light radiation were provided. After predetermined time lapsed (after 1, 2, 3 and 4 hours), the samples were taken out and the bacterial solution attached to the samples was wiped off by using disinfected gauze rinsed in sterilized physiological saline solution. The sterilized gauze used was put into 10 ml sterilized physiological saline and throughly stirred. The supernatant of the bacterial solution obtained was inoculated to an agar medium prepared in a petri dish having a diameter of 95 mm which is sterilized by using an autoclave. Then, number of the colonies of colon bacillus cultivated at 36° C. for 24 hours was counted. Another sample obtained according to the same prodedure from dropping of the bacterial solution through placing into an incubator was treated according to the same method as described above, and the number of colonies of colon bacillus was counted. Based on the counted-number, the survival rate of the bacteria after each predetermined time was calculated for each group exposed to no light, black light and flourescent lamp, respectively. The evaluation criterion accorded to the following.

| Survival Rate (%) of Clon Bacillus after 4 Hours | Evaluated-rank |
| --- | --- |
| <20% | A |
| 20–40% | B |
| 40–60% | C |
| 60–80% | D |
| 80%< | E |

8) Evaluation of Soiling Resistant Property (Decomposition Activity of Fat and Oil)

As an index to evaluate soiling resistant function of the sample, a decomposed amount of common salad oil mainly composed of linoleic acid on a photocatalyst-carrying structure was qualitatively determined in order to know how fast can fat and oil attached on the surface be decomposed. To the surface of a photocatalyst-carrying structure cut into pieces with a dimension of 5×5 cm, salad oil was applied slightly at a dose of 0.1–0.15 mg/ced by using a paper. The quantity applied was calculated from the difference of the weight of the structure before and after an application of oil that were measured by using an acurate balance. As an index of soiling resistant property, decomposed amounts of salad oil after predetermined time were determined by adjusting the distance between the sample and black light to take a point where an ultraviolet ray intensity on a surface of the sample becomes 3 mW/cm$^2$ and calculating the relationship between lapsing time and weight decrease amount after lighting black light.

| Remaining rate (%) of Salad Oil after 24 Hours Light Irradiation | Evaluated-rank |
| --- | --- |
| <10% | A |
| 30–10% | B |
| 50–30% | C |
| 80–50% | D |
| 80%< | E |

EXAMPLES

As a material for a substrate, the following were used.
(TA) Primer-treated polyester film
(TB) Vinyl chloride film
(TC) Soda lime glass plate
(TD) Metal aluminium plate
(TE) High-density polyethylene mesh (Thickness of fiber: 0.2 mm, Mesh size: 0.6 mm)
(TF) Polypropylene tube (Inner diameter: 30 mm, Outer diameter: 36 mm)

As polysiloxane contained in an adhesive layer, the followings were used.
(PS-1) Silicon tetramethoxide monomer (Manufactured by Shinetsu Chemical Industry Co., Ltd.)
(PS-2) Polymethoxy siloxane (Manufactured by Colcoat Co., Ltd., Trade Name: Methyl silicate 51)
(PS-3) Polyethoxy siloxane (Manufactured by Colcoat Co., Ltd., Trade Name: Ethyl silicate 40)

As colloidal silica contained in an adhesive layer, the followings were used.
(KS-1) Trade Name: Cataloid SI-350 (Manufactured by Shokubai Kagaku Co., Ltd., Particle diameter: 7–9 nm)
(KS-2) Trade Name: Snowtex ST-XS (Manufactured by Nissan Chemical Industries Co., Ltd., Particle diameter: 4–6 nm)

As a resin solution whereto polysiloxane or colloidal silica is introduced, the followings were used.
(J-1) 3% by weight of silicon containing acryl-silicon resin solution in xylene
(J-2) 10% by weight of silicon containing acryl-silicon resin solution in xylene
(J-3) 20% by weight of silicon containing acryl-silicon resin emulsion in water
(J-4) 50% by weight of silicon containing acryl-silicon resin emulsion in water
(J-5) 10% by weight of silicon containing polyester-silicon resin solution in xylene
(J-6) Acryl resin solution in xylene (J-7) Polyester resin solution in xylene
(J-8) 3% by weight of silicon containing epoxy-silicon resin solution in methylethylketone Either polysiloxane or colloidal silica was mixed with a resin solution, and the mixture obtained was diluted to a certain concentration to thereby prepare a solution to be used for forming an adhesive layer. The adhesive layer was formed by employing dipping method when a thickness of the layer is 2 $\mu$m or less and the configuration thereof is other than plate-like, whereas it is formed by using baker applicator when the thickness is 2 $\mu$m or more and the configuration thereof is plate-like. In particular, the adhesive layer is formed according to dipping method when the configuration of the substrate is tubular or reticular. Drying process for the adhesive layer was taken place at 80° C. when the material of the substrate is (TE) or (TF), and at 60° C. when the material is (TB), and at 120° C. in all other cases.

For the photocatalyst, the following materials were used.
(C-1) Fine powder of titanium dioxide (Manufactured by Nihon Aerozil Co., Ltd., Trade Name: P-25, diameter of crystallite size: 27 nm)
(C-2) Titanium dioxide sol (sol acidified with nitric acid, diameter of crystallite size: 10 nm)
(C-3) Titanium dioxide sol (weak alkaline sol of pH 9.0, diameter of crystallite size: 20 nm)

A metal oxide sol or a metal hydroxide sol carried together with a photocatalyst was obtained by drying any of the following materials in sol.
(Z-1) Silica sol: Manufactured by Shokubai Kasei Co., Ltd., Trade Name: Cataloid SI-30, specific surface area after drying at 150° C.: 180 m$^2$/g
(Z-2) Alumina sol: Manufactured by Nissan Chemical Industries Co., Ltd., Trade Name: Alumina Sol-200, specific surface area after drying at 150° C.: 400 m$^2$/g
(Z-3) Zirconia sol: This is obtainable by allowing zirconium tetrabutoxide (TBZR; Manufactured by Nippon Soda Co., Ltd.,) to hydrolyzation in ethanol, drying at 150° C., then heating at 300–500° C., and further allowing to deflocculation with a diluted aqueous solution of nitric acid. Specific surface area of further dried product at 150° C. of the deflocculated-sol is in a range of from 50 to 80m$^2$/g.
(Z-4) Niobium oxide sol: This is obtainable by allowing aqueous solution of niobium oxalate manufactured by CBMM Co., Ltd. to neutrization with 10% aqueous ammonia, drying at 150° C., and then allowing to deflocculation with a diluted aqueous solution of nitric acid. Specific surface area of further dried product at 150° C. of the deflocculated-sol is 60 m$^2$/g.
(Z-5) 20% by weight of silicon containing acryl-silicon resin emulsion in water
(Z-6) Silane coupler, tri($\beta$-methoxyethoxy)vinyl silane (Trade Name: A-172), manufactured by Nippon Uniker Co., Ltd.

A solution used for forming a photocatalyst layer was prepared by dispersing titanium dioxide into the solution obtained as described above and adding a predetermined amount of a surfactant. The photocatalyst layer was formed by dipping method when the thickness of the layer is 2 $\mu$m or less and/or the configuration of a substrate is the one other than plate-like, whereas the photocatalyst layer was formed by using bar coater when the substrate is plate and its thickness is 2 $\mu$m or more. Drying process for the photocatalyst layer was taken place at the same temperature as for drying the adhesive layer.

Hereunder, compositions disclosed in the examples for the embodiment of the present invention and reference examples, wherein type, quantity and/or thickness of materials, and/or method for forming films are different, and performances of the photocatalyst-carrying structure are described in Tables 1 through 4.

In the examples 1 through 18 and the reference examples 1 through 4, titanium dioxide (P-25) manufactured by Nihon Aerozil Co., Ltd., which is represented at (C-1), was used as a photocatalyst. The result is shown in Table 1.

TABLE 1

| | | Adhesive Layer | | | | Photocatalyst Layer | | Thickness of Adhesive Layer ($\mu$m) | Thickness of Photocatalyst Layer ($\mu$m) | Photocatalytic Activity | Adhesive Property | | Whole Light Transmittance (%) |
|---|---|---|---|---|---|---|---|---|---|---|---|---|---|
| | | Polysiloxane | | Colloidal Silica | | | | | | | Before Durability Test | After Durability Test | |
| | Carrier | Type | Content*1 | Type | Content*1 | Resin Solution | Metal Oxide Sol | | | | | | |
| | | | | | | | Type | Content*2 | | | | | | |
| Example-1 | TA | — | — | — | — | J-2 | Z-1 | 50 | 10 | 3 | B | 8 | 6 | 82 |
| Example-2 | TC | — | — | — | — | J-5 | Z-1 | 75 | 5 | 5 | B | 10 | 8 | 75 |
| Example-3 | TA | PS-1 | 10 | — | — | J-1 | Z-1 | 50 | 5 | 3 | A | 10 | 10 | 82 |
| Example-4 | TA | PS-1 | 20 | — | — | J-2 | Z-1 | 75 | 5 | 5 | A | 10 | 10 | 80 |
| Example-5 | TC | PS-2 | 5 | — | — | J-1 | Z-1 | 50 | 1 | 0.5 | A | 10 | 10 | 90 |
| Example-6 | TB | PS-2 | 20 | — | — | J-2 | Z-1 | 30 | 5 | 2 | A | 10 | 8 | 85 |
| Example-7 | TA | PS-2 | 50 | — | — | J-6 | Z-1 | 70 | 1 | 0.5 | B | 8 | 8 | 90 |
| Example-8 | TE | PS-2 | 20 | — | — | J-2 | Z-1 | 50 | (*3) | (*3) | C | (*4) | (*4) | (*5) |
| Example-9 | TF | PS-2 | 35 | — | — | J-5 | Z-1 | 60 | 10 | 5 | A | 10 | 10 | (*5) |
| Example-10 | TD | PS-3 | 20 | — | — | J-1 | Z-1 | 50 | 10 | 7 | A | 10 | 8 | (*5) |
| Example-11 | TD | PS-3 | 20 | — | — | J-2 | Z-2 | 80 | 5 | 1 | B | 10 | 8 | (*5) |
| Example-12 | TA | PS-3 | 10 | — | — | J-7 | Z-1 | 50 | 10 | 5 | A | 8 | 8 | 72 |

*1: Percent by weight as SiO$_2$ contained in a dried adhesive layer.
*2: Percent by weight of either a metal oxide gel or a metal hydroxide gel contained in a dried adhesive layer.
*3: The measurement of thickness could not be done.
*4: No detachment was observed after ultrasonification for 10 min.
*5: The determination could not be made because of complex configuration and opaque property of the carrier.
*6: In example 35, sol wherein silica-alumina component is compounded at this ratio beforehand is used.

TABLE 1-continued

| | | Adhesive Layer | | | | | Photocatalyst Layer | | Thickness of Adhesive Layer (μm) | Thickness of Photocatalyst Layer (μm) | Photocatalytic Activity | Adhesive Property Before Durability Test | Adhesive Property After Durability Test | Whole Light Transmittance (%) |
|---|---|---|---|---|---|---|---|---|---|---|---|---|---|---|
| | Carrier | Polysiloxane Type | Content*1 | Colloidal Silica Type | Content*1 | Resin Solution | Metal Oxide Sol Type | Content*2 | | | | | | |
| Example-13 | TA | — | — | KS-1 | 20 | J-3 | Z-1 | 50 | 10 | 3 | A | 10 | 8 | 82 |
| Example-14 | Tb | — | — | KS-1 | 10 | J-4 | Z-1 | 40 | 10 | 5 | A | 8 | 6 | 75 |
| Example-15 | TA | — | — | KS-2 | 20 | J-3 | Z-1 | 50 | 5 | 3 | A | 10 | 8 | 82 |
| Example-16 | TD | — | — | KS-2 | 35 | J-4 | Z-1 | 50 | 2 | 1 | B | 10 | 10 | (*5) |
| Example-17 | TA | — | — | KS-2 | 10 | J-3 | Z-1 | 50 | 0.5 | 0.1 | C | 10 | 10 | 90 |
| Example-18 | TC | — | — | KS-2 | 20 | J-7 | Z-1 | 70 | 5 | 2 | B | 8 | 6 | 72 |
| Reference Example-1 | TA | — | — | — | — | — | Z-1 | 50 | — | 2 | B | 0 | 0 | 50 |
| Reference Example-2 | TA | PS-2 | 70 | — | — | J-1 | Z-1 | 50 | 5 | 3 | E | (*6) | (*6) | (*6) |
| Reference Example-3 | TC | — | — | KS-2 | 50 | J-3 | Z-1 | 50 | 5 | 2 | B | 2 | 0 | 10 |
| Reference Example-4 | TC | PS-2 | 20 | — | — | J-2 | Z-1 | 20 | 5 | 5 | A | 2 | 2 | 20 |

*1: Percent by weight as $SiO_2$ contained in a dried adhesive layer.
*2: Percent by weight of either a metal oxide gel or a metal hydroxide gel contained in a dried adhesive layer.
*3: The measurement of thickness could not be done.
*4: No detachment was observed after ultrasonification for 10 min.
*5: The determination could not be made because of complex configuration and opaque property of the carrier.
*6: The determination could not be made because the photocatalyst layer was exfoliated at the time of formation.

In reference example 1, a structure carrying a photocatalyst layer without providing an adhesive layer is given. In this case, the phtocatalyst layer has no sticking property and is easily defoliated. Furthermore, after durability test, the surface of polyester film deteriorated due to a photocatalytic effect, and holes and cracks were observed on the film.

In examples 1 and 2, a structure wherein either acryl-silicon resin or polyester-silicon resin is used as an adhesive layer is given. In this case, the addhesive property of a photocatalyst layer and durability of the structure was found to be excellent.

In examples 3 through 12, a structure wherein a resin containing polysiloxane is used as the adhesive layer is given. In this case, adhesive property and durability was improved. As well as the resin containing poysiloxane, acryl-silicon resin (see examples 3, 4 and 5) and polyester-silicon resin (see example 9) had also acquired good durability. Further, the resin containing polysiloxane was found to be replaceable with either acryl resin (see example 7) or polyester resin (example 12), both of which provided excellent property to the structure.

Contrary, as shown in reference example 2, even though using acryl-silicon resin containing polysiloxane for the adhesive layer, a photocatalyst layer lost its adhesive property and was defoliated from the adhesive layer when the content of polysiloxane in the adhesive layer is increased up to 70% by weight.

In examples 13 through 18, a structure wherein a resin containing colloidal silica was used as the adhesive layer is given. In these cases, all of photocatalytic activity, adhesive property and durability were found to be excellent. In particular, when acryl-silicon resin and colloidal silica in fine particle size (KS-2) were used (examples 15 and 16), the resulting adhesive layer was found to be very good.

Contrary, when increasing the content of colloidal silica in the adhesive layer up to 50% by weight, both adhesive property and durability were become worse radically.

In examples 1 through 18, titanium dioxide (P-25) manufactured by Nihon Aerozil Co., Ltd. represented by (C-1) was used as a photocatalyst, and silica sol was used in most cases as a metal oxide sol or a metal hydroxide sol to be compounded to the photocatalyst layer, and the structures in all examples are provided with excellent properties. In examples 8 and 9, the structures wherein both layers are carried on a substrate made of polyethylene mesh or polypropylene tube were disclosed, and it is demonstrated that these structures show excellent photocatalytic activity, adhesive property and durability. It is also found that such excellent property was still noticeable even decreasing the content of silica sol in the photocatalyst layer down to 30% by weight (see example 6), however, both adhesive property and durability radically deteriorated when reducing the content down to 20% by weight (see example 4).

In example 11, a structure wherein alumina sol was used instead of silica sol is given, and this structure is also found as excellent in the property as well as using silica sol.

In example 17, a structure wherein a thickness of an adhesive layer and a photocatalyst layer was set to 0.5 μm and 0.1 μm, respectively.

In this case, both adhesive property and durability were excellent, and photocatalytic activity was found to be very high even the thickness of the photocatalyst layer was very thin.

Data obtained in examples 19 through 23 are shown in Table 2.

TABLE 2

| | | Adhesive Layer | | Resin Solu- | Photocatalyst Layer Metal Oxide Sol | | Thick- ness of Adhesive Layer ($\mu$m) | Thick- ness of Photoca- talyst Layer ($\mu$m) | Photo- catalytic Activity | Adhesive Property | | Whole Light Trans- mit- tance (%) |
| | Carrier | Polysiloxane Type | Content*1 | tion | Type | Content*2 | | | | Before Dura- bility Test | After Dura- bility Test | |
|---|---|---|---|---|---|---|---|---|---|---|---|---|
| Example-19 | TC | PS-2 | 35 | J-1 | Z-1 | 50 | 5 | 3 | A | 10 | 10 | 93 |
| Example-20 | TC | PS-2 | 35 | J-1 | Z-3*3 | 50 | 5 | 3 | A | 10 | 10 | 82 |
| Example-21 | TA | PS-2 | 35 | J-5 | Z-1 | 60 | 3 | 3 | A | 10 | 10 | 95 |
| Example-22 | TC | PS-2 | 35 | J-5 | Z-1 | 60 | 3 | 2 | A | 10 | 10 | 90 |
| Example-23 | TA | PS-3 | 10 | J-8*4 | Z-1 | 50 | 10 | 5 | A | 10 | 10 | 80 |

*1: Percent by weight as SiO$_2$ contained in a dried adhesive layer.
*2: Percent by weight of either a metal oxide gel or a metal hydroxide gel contained in a dried adhesive layer.
*3: An uniform solution prepared by mixing alumina sol and silica sol at a mixing ratio of 1:1 was used.
*4: Mtheyl ethyl ketone solution of epoxy-silicon resin containing 3% by weight of silicon was used.

Example 19

Use of Titania Sol

A coating material to be used for forming a photocatalyst layer was prepared by adding and dispersing titania sol containing 12% by weight of titanium dioxide and acidified with nitric acid, which is a substitute of fine granule titanium dioxide (P-25) manufactred by Nihon Aerozil Co., Ltd., into silica gel (Trade name: Cataloid SI-30, Manufactured by Shokubai Kasei Co., Ltd.) being adjusted to pH 1.5 and then further adding a surfactant. Whereas, a solution to be used for an adhesive layer was prepared by adding polymethoxy siloxane (PS-2) into a resin solution used in the example 10 at a rate such that the content of silicon oxide in a dried adhesive layer becomes 35% by weight.

The solution for forming an adhesive layer was applied by using a baker applicator onto a soda lime glass substrate with a thickness of 1 mm and a dimension of 7 cm×7 cm, and the coating material for forming a photocatalyst layer was also applied by using bar coater onto the same substrate. Drying temperature was set to the same employed in the examples described above.

The photocatalyst-carrying structure obtained was found to have very high whole light transmittance.

Example 20

Use of Silica-alumina Sol

A photocatalyst-carrying structure was prepared by using the same materials and according to the same method as described in the example 19 except replacing silica sol used in the example 19 with a mixed sol solution consisting of alumina sol manufactured by Nissan Chemical Industries Co., Ltd. and silica sol.

The photocatalyst-carrying structure obtained was found to have high adhesive property and photocatalytic activity.

Example 21

Coating According to Gravure Printing Method

By using gravure printing system, the solution for forming an adhesive layer and the solution for forming a photo catalyst layer were applied onto a polyester film (Trade name: Cosmoshine A4100) manufactured by Toyobo Co., Ltd. at a speed of 10 m/min. and at dry zone temperature of 130° C. such that the thickness of each layers become 3 $\mu$m, respectively. For the printing, a microgravure coater with a width of 70 cm manufactured by Yasui Seiki Co., Ltd. was used.

The photocatalyst-carrying structure obtained was found to have very high whole light transmittance of 95%.

Example 22

Coating According to Spraying Method

The solution for forming an adhesive layer and the solution for forming a photocatalyst layer used in the example 9 were sprayed onto a substrate made of soda lime glass by using a spray gun (Type: WIDER 88, Manufactured by Iwata Tosoki Kogyo K.K.). Both solutions for forming adhesive layer and for photocatalyst layer were dried at 120° C. for 30 minutes.

The photocatalyst-carrying structure obtained was found to have good adhesive property and photocatalytic activity.

Example 23

Use of Epoxy-silicon Resin

A photocatalyst-carrying structure was prepared by using the same materials and employing the same method as described in the example 12 except replacing the polyester resin solution in xylene with methy ethyl ketone solution of epoxy resin containing 3% by weight of silicon.

The photocatalyst-carrying structure obtained was found to have good adhesive property and photocatalytic activity.

The compositions and the results of performance tests on the photocatalyst-carrying structures are presented in Table 3.

TABLE 3

| | | Adhesive Layer | | | | Photocatalyst Layer | | | | | |
| | | Polysiloxane | | Colloidal Silica | | Resin | Titanium Dioxide | Z-1 | Z-2 | Z-3 | Z-4 |
| | Carrier | Type | Content*1 | Type | Content*1 | Sol. | Type | Content*2 | Content*2 | Content*2 | Content*2 | Content*2 |
|---|---|---|---|---|---|---|---|---|---|---|---|
| Example-24 | TA | — | — | — | — | J-1 | C-1 | 50 | 25 | 25 | — | — |
| Example-25 | TC | — | — | — | — | J-2 | C-1 | 50 | 25 | 25 | — | — |
| Example-26 | TC | PS-1 | 20 | — | — | J-1 | C-1 | 25 | 65 | — | — | 10 |
| Example-27 | TC | PS-1 | 20 | — | — | J-2 | C-1 | 25 | 60 | — | 15 | — |
| Example-28 | TA | PS-2 | 30 | — | — | J-1 | C-1 | 60 | 20 | 20 | — | — |
| Example-29 | TC | PS-2 | 50 | — | — | J-8 | C-2 | 50 | 20 | 20 | 10 | — |
| Example-30 | TC | PS-2 | 20 | — | — | J-8 | C-2 | 70 | 20 | 10 | — | — |
| Example-31 | TA | PS-3 | 20 | — | — | J-6 | C-2 | 25 | 40 | 35 | — | — |
| Example-32 | TE | — | — | KS-1 | 20 | J-3 | C-1 | 30 | 40 | 20 | — | 10 |
| Example-33 | TF | — | — | KS-1 | 10 | J-4 | C-1 | 50 | 30 | 10 | 10 | — |
| Example-34 | TD | — | — | KS-2 | 30 | J-3 | C-1 | 20 | 40 | 10 | 30 | — |
| Example-35 | TC | — | — | KS-2 | 35 | J-3 | C-1 | 30 | 65 | 5 | — | — |

| | Thickness of Adh. Layr ($\mu$) | Thickness of Pho. Layr ($\mu$) | Photocatalytic Activ. Aldehyde Dec. Activ. | Adhesive Property Bfr. Durability Test | Adhesive Property Aft. Durability Test | Adh. Pro. aft. B.W. Test | After Sunshine Weather Meter Test Surface State | After Sunshine Weather Meter Test Adh. Property | Whole Light Transmittance % |
|---|---|---|---|---|---|---|---|---|---|
| Example-24 | 10 | 5 | A | 10 pt | 8 pt | 10 pt | A | 8 pt | 72 |
| Example-25 | 10 | 5 | A | 10 | 8 | 10 | A | 8 | 70 |
| Example-26 | 5 | 3 | A | 10 | 8 | 8 | A | 8 | 80 |
| Example-27 | 10 | 3 | A | 10 | 6 | 8 | A | 6 | 75 |
| Example-28 | 3 | 1 | A | 10 | 10 | 10 | A | 8 | 86 |
| Example-29 | 0.5 | 0.3 | C | 10 | 8 | 8 | A | 6 | 92 |
| Example-30 | 5 | 3 | A | 10 | 6 | 8 | A | 6 | 80 |
| Example-31 | 5 | 3 | A | 10 | 8 | 8 | A | 8 | 75 |
| Example-32 | 10 | 7 | A | —*3 | —*3 | —*3 | A | —*3 | —*4 |
| Example-33 | 5 | 3 | A | 10 | 8 | 8 | A | 8 | —*4 |
| Example-34 | 3 | 2 | B | 10 | 8 | 10 | A | 8 | —*5 |
| Example-35 | 3 | 3 | A | 10 | 10 | 10 | A | 8 | 88 |

*1: Percent by weight as $SiO_2$ contained in a dried adhesive layer.
*2: Percent by weight of either a metal oxide gel or a metal hydroxide gel contained in a dried adhesive layer.
*3: Since Cross-cut Scotch tape test could not be employed, the surface of the sticking tape side was observed by using a binocular, and it is noted that the photocatalyst layer did not stick to the surface.
*4: The determination could not be made due to the difference in configuration.
*5: The determination could not be made because of an opaque carrier.

Examples 24–25

In examples 24 and 25, a structure, wherein acryl-silicon resin is used for forming an adhesive layer, and a mixture prepared and composed with 50% by weight of fine granule titanium dioxide P-25 (C-1), 25% by weight of silica sol represented at (Z-1) and 25% by weight of alumina sol represented at (Z-2) are used for forming a photocatalyst layer, is disclosed. The structures disclosed in these examples were found to have good adhesive property as well as good durability and resistant property under accelerated weathering condition.

Examples 26–31

In examples 26 through 31, a structure, wherein a resin containing polysiloxane was used for forming an adhesive layer, and for forming a photocatalyst layer, fine granule titanium dioxide (C-1) was used in examples 26 through 28 while titania sol (C-2) was used in examples 29 through 31, and the type and the quantity of a sol for forming a compoundable gel were changed, is disclosed. The structures prepared in these examples were found to have good photocatalytic activity as well as good adhesive property, durability and resistant property against accelerated weathering tests following to receiving boiling water test.

The resins introduced with polysiloxane, such as acryl-silicon resin (examples 26, 27 and 28) and epoxy-silicon resin (examples 29 and 30), were found to have good adhesive property, durability and resistance against accelerated weathering. Also, acryl resin introduced with polysiloxane (example 31) was found to have good properties.

Examples 32–35

In examples 32 and 33, a structure, wherein either polyethylen mesh or polypropylene tube was used as the substrate was presented, however, the photocatalyst-carrying structure having good photocatalytic activity, adhesive property and durability was not obtained.

In examples 32 through 35, structures, wherein a resin containing colloidal silica was used for forming an adhesive layer, are disclosed, and photocatalytic activity, adhesive property, durability and resistance against accelerated weathering of such structures were found to be excellent. In particular, when the structure is prepared with colloidal silica in fine particles (KS-2) and the colloidal silica is introduced into acryl-silicon resin emulsion (see examples 34 and 35), this type of structure was found to have very good properties.

In example 29, a structure, wherein a photocatalyst layer was formed with a coating material prepared by dispersing titania sol containing 12% by weight of titanium dioxide, silica gel (Trade name: Cataloid SI-30, manufactured by Shokubai Kasei Co., Ltd.) and alumina sol-200 manufactured by Nissan Chemical Industries Co., Ltd., adjusting the pH of the resulting mixture to 1.5 and adding a predetermined amount of a surfactant to the mixture, and the thickness of an adhesive layer and a photocatalyst layer was made to 0.5 μm and 0.3 μm by dipping method, respectively, is disclosed. The structure provided with the layers as described above was found to have good adhesive property and durability as well as high photocatalytic activity, nonethless of the thin thickness of the photocatalyst layer.

A structure with excellent physical property was also obtained even if contents in total of silica gel and alumina sol in a photocatalyst were reduced down to 30% by weight (see example 30).

Photocatalytic activity was determined again on the samples, which were prepared in the examples 24 through 35 and were allowed to a durability test under black light at a high temperature and high humidity, dipping test in boiling water and accelerated weathering test by using Sunshine carbon arc weather meter, according to the same method as described above, namely based on the decomposed amount of acetaldehyde by light. As a result, it is found that all samples showed equivalent decomposing activity to the initial decomposed-amount of acetaldehyde, and it is found that the samples have fully kept their intial photocatalytic activity.

The compositions and performance test results on the photocatalyst-carrying structures disclosed in the examples 36 through 53 are presented in Tables 4 and 5.

TABLE 4

| | | Adhesive Layer | | | Photocatalyst Layer | | | | | | | Adhesive Layer Thickness ($\mu$) | Photocatalyst Layer Thickness ($\mu$) |
|---|---|---|---|---|---|---|---|---|---|---|---|---|---|
| | Carrier | Type | Content*1 | Resin Sol. | Titanium Dioxide Type | Content*1 | Z-1 Content*2 | Z-2 Content*2 | Z-3 Content*2 | Z-5 Content*2 | Z-6 Content*2 | | |
| Example-36 | TA | — | — | J-1 | C-1 | 50 | 40 | — | — | 10 | — | 10 | 6 |
| Example-37 | TB | — | — | J-1 | C-1 | 40 | 40 | — | — | 20 | — | 10 | 6 |
| Example-38 | TA | PS-1 | 15 | J-1 | C-1 | 40 | 10 | — | — | 10 | — | 7 | 7 |
| Example-39 | TB | PS-1 | 30 | J-1 | C-1 | 25 | — | — | — | 50 | — | 7 | 3 |
| Example-40 | TC | PS-1 | 45 | J-2 | C-1 | 20 | 30 | 10 | 10 | 30 | — | 3 | 3 |
| Example-41 | TB | PS-1 | 10 | J-2 | C-1 | 25 | 50 | — | 10 | 15 | — | 5 | 3 |
| Example-42 | TA | PS-2 | 20 | J-2 | C-1 | 40 | 30 | 10 | — | 10 | 10 | 3 | 1 |
| Example-43 | TB | PS-2 | 30 | J-8 | C-1 | 40 | 20 | 10 | — | 20 | 10 | 0.6 | 0.2 |
| Example-44 | TD | PS-2 | 45 | J-7 | C-2 | 50 | 20 | — | 10 | 20 | — | 5 | 3 |
| Example-45 | TE | PS-2 | 10 | J-1 | C-2 | 50 | 20 | 10 | — | — | 20 | 6 | 6 |
| Example-46 | TB | PS-2 | 20 | J-8 | C-2 | 25 | 30 | 25 | — | — | 20 | 5 | 3 |
| Example-47 | TB | PS-3 | 30 | J-6 | C-2 | 60 | 10 | 10 | — | 15 | 5 | 3 | 3 |
| Example-48 | TA | KS-1 | 10 | J-3 | C-1 | 30 | 20 | 10 | — | 35 | 5 | 10 | 6 |
| Example-49 | TB | KS-1 | 20 | J-4 | C-1 | 50 | 30 | 10 | — | 5 | 5 | 5 | 3 |
| Example-50 | TC | KS-2 | 30 | J-3 | C-1 | 20 | 30 | 10 | — | 30 | 10 | 5 | 3 |
| Example-51 | TB | KS-2 | 40 | J-4 | C-2 | 30 | 40 | 20 | — | 10 | — | 3 | 3 |
| Example-52 | TD | KS-2 | 20 | J-3 | C-2 | 60 | 20 | — | — | 20 | — | 5 | 3 |
| Example-53 | TE | KS-2 | 30 | J-3 | C-2 | 20 | 40 | — | 10 | 30 | — | 5 | 2 |
| Reference Example-5 | TA | — | — | — | C-1 | 40 | 30 | 10 | — | 20 | — | 10 | 10 |
| Reference Example-6 | TB | PS-1 | 70 | J-1 | C-1 | 40 | 30 | 10 | — | 20 | — | 10 | 6 |
| Reference Example-7 | TA | KS-1 | 50 | J-3 | C-1 | 40 | 30 | 10 | — | 20 | — | 10 | 6 |
| Reference Example-8 | TB | PS-1 | 30 | J-1 | C-1 | 45 | 30 | 20 | — | 5 | — | 7 | 3 |

*1: % by weight as $SiO_2$ in a dried adhesive layer.
*2: % by weight of titanium dioxide and either a metal oxide gel or a metal hydroxide gel in total in a dried photocatalyst layer.

TABLE 5

|  | Photocatalytic Activity | Adhesive Property Before Durability Test | Adhesive Property After Durability Test | Sunshine Weather Meter After Boiling Water Test | State of Surface After Test | Adhesive Property After Test | Whole Light Transmittance (%) |
|---|---|---|---|---|---|---|---|
| Example-36 | A | 10 pt. | 8 pt. | 10 pt. | A | 8 pt. | 68 |
| Example-37 | A | 10 | 8 | 10 | A | 8 | 65 |
| Example-38 | A | 10 | 10 | 8 | A | 8 | 63 |
| Example-39 | B | 10 | 10 | 8 | A | 8 | 75 |
| Example-40 | B | 10 | 10 | 10 | A | 8 | —*5 |
| Example-41 | B | 10 | 8 | 8 | A | 6 | 71 |
| Example-42 | C | 10 | 10 | 10 | A | 8 | 82 |
| Example-43 | C | 10 | 8 | 8 | A | 6 | 87 |
| Example-44 | B | —*3 | —*3 | —*3 | A | —*3 | —*4 |
| Example-45 | A | 10 | 10 | 8 | A | 8 | —*4 |
| Example-46 | B | 10 | 8 | 10 | A | 6 | 75 |
| Example-47 | B | 10 | 8 | 8 | A | 6 | 70 |
| Example-48 | A | 10 | 8 | 8 | A | 8 | 66 |
| Example-49 | B | 10 | 8 | 8 | A | 8 | 77 |
| Example-50 | B | 10 | 8 | 10 | A | 8 | —*5 |
| Example-51 | B | 10 | 8 | 10 | A | 8 | 83 |
| Example-52 | B | —*3 | —*3 | —*3 | A | —*3 | —*4 |
| Example-53 | C | 10 | 8 | 10 | A | 6 | —*4 |
| Reference Example-5 | A | 2 | 2 | 0 | C | 0 | 54 |
| Reference Example-6 | A | 4 | 2 | 2 | C | 2 | 52 |
| Reference Example-7 | A | 4 | 2 | 2 | C | 2 | 48 |
| Reference Example-8 | B | 4 | 4 | 2 | C | 4 | 51 |

*3: Since cross-cut Scotch tape test cannot be employed, the observation was made on the surface of the sticking tape side by using binocular. As a result, a photocatalyst layer has not been sticked.
*4: The determination of the light transmittance could not be made due to its abmormal configuration.
*5: The determination of the light transmittance could not be made because of an opaque carrier.

In reference example 5, a structure, wherein a photocatalyst layer is carried but no adhesive layer is carried thereon, is disclosed. In this case, the photocatalyst layer has no adhesive property and is easily defloiated from the substrate, and it is obserbed that the surface of polyester film after receiving a durability test was deteriorated due to photocatalytic action, and the presence of holes and cracks were observed on the film through a binocular.

In examples 36 and 37, a structure, wherein acryl-silicon resin was used for forming an adhesive layer and a complex prepared and composed with 40–50% by weight of fine granule titanium dioxide P-25 manufactured by Nihon Aerozil Co., Ltd., 40% by weight of silica sol represented at (Z-1) and 10–20% by weight of acryl-silicon resin emulsion was used for forming a photocatalyst layer, is disclosed. The structures disclosed in these examples were found to have good adhesive property after receiving boiling test as well as good durability and resistance against accelerated weathering.

In examples 38 through 42, a structure, wherein acryl-silicon resin containing polysiloxane was used for forming an adhesive layer and the same photocatalyst powder as the one used in the example 36 was used for forming a photocatalyst layer, and type and content of a sol for forming compoundable gel were changed, is disclosed. The structures prepared in these examples were found to have good photocatalytic activity as well as good adhesive property, durability and resistance against accelerated weathering after receiving boiling water test. In both cases that the resin whereto polysiloxane was introduced was acryl-silicon resin containing 3% by weight of silicon (examples 38 and 39) or acryl-silicon resin containing 10% by weight of silicon (examples 40, 41 and 42), the adhesive property, durability and resistance against accelerated weathering of the structures were found to be excellent.

In examples 44 and 45, a structure, wherein an adhesive layer and a photocatalyst layer were carried on either polyethylene mesh or polypropylene tube, is disclosed, and the structures prepared in these examples were found to have good photocatalytic activity, adhesive property and durability.

Such good physical properties were also observed for the structures wherein the resin whereto polysiloxane was introduced is any of epoxy-silicon resin (examples 43 and 46), polyester resin (example 44) and acryl resin (example 47).

However, as shown in reference example 6, a photocatalyst layer lost its adhesive property and was defoliated, when the content of polysiloxane in an adhesive layer became 70% by weight even though acryl-silicon resin containing polysiloxane was used for the adhesive layer.

In examples 48 through 53, a structure, wherein a resin containing colloidal silica was used for forming an adhesive layer, and the structures prepared in these examples were found to have good photocatalytic activity, adhesive property after receiving boiling water test, durability and resistance against accelerated weathering. In particular, the structures, wherein colloidal silica having fine particle diameter (KS-2) and acryl-silicon emulsion resin introduced with said colloidal silica were used (examples 50 through 53), were found to have excellent physical properties.

Whereas, the adhesive property and the durability of the structure, wherein the content of colloidal silica in the adhesive layer was increased to 50% by weight (reference example 7), was found to be radically deteriorated.

In examples 44 through 47, a structure, wherein an adhesive layer and a photocatalyst layer were provided by bar coat method, and a coating material for forming the phohtocatalyst layer was prepared by dispersing titania sol acidified with nitric acid and containing 12% by weight of titanium dioxide, which was replaced from fine granule titanium dioxide (P-25) manufactured by Nihon Aerozil Co., Ltd., silica gel (Trade name: Cataloid SI-30) manufactured by Shokubai Kasei Co., Ltd. and either alumina sol-200 manufactured by Nissan Chemical Industries Co., Ltd. or zirconia sol manufactured by Nippon Soda Co., Ltd., adjusting the pH of the resulting mixture to 1.5, and adding a predetermined amount of a surfactant to the said mixture. The structures prepared in these examples were found to have good adhesive property and durability as well as high photocatalytic activity even though the thickness of the photocatalytic layer is relatively thin.

In example 47, a structure having good physical properties was obtained even decreasing the content in total of acryl-silicon resin emulsion and silane coupler in a photocatalyst layer down to 20% by weight, however, in reference example 8, adhesive property and durability were radically decreased when such content in total was reduced down to 5% by weight even adding acryl-silicon resin emulsion to the photocatalyst layer.

The samples obtained in the examples 36 through 53 and allowed to all of a durability test under irradiation of black light at a high temperature and high humidity, dipping test in boiling water, and accelerated weathering test using Sunshine carbon arc weather meter, were checked again for their photocatalytic activity according to the same method employed at the start of this test based on decomposed-amount of acetaldehyde by light, and it is found that all samples showed the same decomposed-amount of acetaldehyde as the ones obtained at the start of this test and have maintained yet the initial photocatalytic activity with a full capacity.

Example 54

According to the method employed in the example 42, a sample of a titanium dioxide photocatalyst-carrying stryctture was prepared, and the antimicrobial activity of the sample was evaluated.

As a result, it was found that the survival rate of colon bacillus on the sample, which was left in a dark place, was 92%, 91% and 91% after 1, 2 and 3 hours, respectivily, whereas such rate on the other sample, which was exposed to black light, was 52%, 22% and 11% after 1, 2 and 3 hours, respectively. The antimicrobial activity was noted even on the sample which was placed under a flourescent lamp, and the survival rate of colon bacillus was 76%, 54% and 22% after 1, 2 and 3 hours, respectively, and those ratios were higher than the ones of the samples left in a dark place.

As a silicon compound used for a coating material of a photocatalyst, the followings were used.

(S-1) 5% by weight ethanol solution of tetraethoxy silane (Super Reagent Grade, Manufactured by Wako Pure Chemical Co., Ltd.).
(S-2) 5% by weight ethanol solution of tetramethoxy silane (Manufactured by Shinetsu Chemical Industry Co., Ltd.
(S-3) 5% by weight ethanol solution of methyltriethoxy silane (Super Reagent Grade, Manufactured by Wako Pure Chemical Co., Ltd.).
(S-4) 5% by weight ethanol solution of tri($\beta$-methoxyethoxy)vinyl silane (Manufactured by Nihon Unikar Co., Ltd., Trade name: A-172).

To a sol solution and a silicon compound solution represented at (Z-1) through (Z-3), either titanium dioxide powder or sol was dispersed as a photocatalyst together with either water or a mixed solvent of water and ethanol while adjusting the pH of the mixture to an appropriate value ranging from 1.5 to 9 depending upon the type of raw materials and additives, and was further added with a prefixed amount of a surfactant to thereby obtain a coating material for forming a photocatalyst layer. The content of the components contained in the said coating material and viscosity and sedimentation state of the particles just after the preparation of the coating material and after 90 days from the sealing are presented in Table 6.

TABLE 6

| | Photocatalyst | | Metal Dioxide | | Silicon Compound | | At Start | | After 90 days | |
|---|---|---|---|---|---|---|---|---|---|---|
| | Type | Content*1 wt % | Type | Content*1 wt % | Type | Content*1 wt % | Viscosity cP | Sedimentation % | Viscosity cP | Sedimentation % |
| Example | | | | | | | | | | |
| 55 | C-1 | 20 | Z-1 | 20 | S-1 | 1 | 31 | 100 | 43 | 90 |
| 56 | C-1 | 10 | Z-1 | 20 | S-1 | 1 | 14 | " | 16 | 85 |
| 57 | C-1 | 5 | Z-1 | 5 | S-1 | 0.2 | 3 | " | 4 | 95 |
| 58 | C-2 | 30 | Z-1 | 10 | S-1 | 2 | 33 | " | 37 | 100 |
| 59 | C-2 | 10 | Z-1 | 10 | S-3 | 0.1 | 7 | " | 9 | 100 |
| | | | Z-2 | 0.3 | | | | | | |
| 60 | C-2 | 2 | Z-1 | 2 | S-3 | 0.01 | 1 | " | 1 | 100 |

TABLE 6-continued

|  | Photocatalyst | | Metal Dioxide | | Silicon Compound | | At Start | | After 90 days | |
| --- | --- | --- | --- | --- | --- | --- | --- | --- | --- | --- |
|  | Type | Content*1 wt % | Type | Content*1 wt % | Type | Content*1 wt % | Viscosity cP | Sedimentation % | Viscosity cP | Sedimentation % |
|  |  |  | Z-2 | 0.05 |  |  |  |  |  |  |
| 61 | C-1 | 0.5 | Z-1 | 0.5 | S-2 | 0.02 | 1 | " | 1 | 95 |
| 62 | C-1 | 0.1 | Z-1 | 0.1 | S-2 | 0.002 | 1 | " | 1 | 95 |
| 63 | C-1 | 3 | Z-1 | 6 | S-1 | 0.2 | 2 | " | 2 | 90 |
|  | C-2 | 3 | Z-3 | 0.2 |  |  |  |  |  |  |
| 64 | C-3 | 5 | Z-1 | 7 | S-4 | 0.2 | 3 | " | 5 | 95 |
| 65 | C-3 | 1 | Z-1 | 2 | S-3 | 0.04 | 2 | " | 2 | 100 |
| 66 | C-3 | 0.2 | Z-1 | 0.2 | S-1 | 0.01 | 1 | " | 1 | 100 |
| Reference Example |  |  |  |  |  |  |  |  |  |  |
| 9 | C-1 | 5 | Z-1 | 5 | — |  | 3 | 100 | 12 | 45 |
| 10 | C-2 | 30 | Z-1 | 10 | — |  | 33 | " | 430 | 55 |
| 11 | C-2 | 10 | Z-1 | 10 | — |  | 7 | " | 23 | 65 |
|  |  |  | Z-2 | 0.3 | — |  |  |  |  |  |
| 12 | C-3 | 5 | Z-1 | 7 | — |  | 3 | " | 9 | 50 |
| 13 | C-3 | 1 | Z-1 | 2 | — |  | 2 | " | 3 | 60 |

Note:
Sedimentation of particles was indicated with a ratio of sedimentation volume relative to the whole volume of the coating solution.
*1: The content is indicated with percent by weight based on the weight of dried coating solution.

In examples 55 through 57, a photocatalyst-carrying structure, wherein titanium dioxide powder (P-25) was used as a photocatalyst, is respectibely disclosed. By the addition of a small amount of a silicon compound, the stability after 90 days of the coating material of a phtocatalyst was improved very much.

In examples 58 through 60, titania sol acidified with nitric acid was used as a photocatalyst, silica gel and alumina sol were jointly used as the compoundable metal oxide sol, and methyltriethoxy silane was used as a silicon compound in examples 59 and 60. By employing this method, remarkable improvement in the resistant property to boiling water, particularly resistance to boiling water in tap water, of the structure formed with a film thereon by applying such coating material, was achieved. In examples 61 and 62, a photocatalyst-carrying structure, wherein tetramethoxy silane was used as a silicon compound, and it is noted that this structure showed an advantage that it can keep the stability of the coating material, even the amount of tetramethoxy silane to add was so small.

In example 63, a photocatalyst-carrying structure, wherein powder titanium dioxide (P-25) and titania sol were jointly used for the photocatalyst, and silica sol and zirconia sol were jointly used for a compoundable metal oxide sol, is provided, whereas a coating material having good stability and sedimental property was obtained by adding tetramethoxy silane in the solution.

In examples 64 through 66, a photocatalyst-carrying structure, wherein a coating material for forming a photocatalyst layer was prepared by changing the type of silicon compounds, and each coating material prepared in these examples were found to be stable at any prefixed amount to add.

On the contrary, in examples 9 through 13, since no silicon compound was added to a coating material, the viscosity of the coating material was drastically increased after 90 days, and sedimentation of particles was cetainly resulted in, and therefore, it was difficult to control the condition for forming films when such coating material was used, and it was not feasible to obtain a photocatalyst-carrying structure having stable quality.

Examples 67 through 71

By using the coating materials prepared in the examples 55 through 59, photocatalyst-carrying structures were prepared by using the substrates recited in the following. The materials used for the substrate were as follows.
(SA) Primer-treated polyester film
(SB) Soda lime-made galss plate
(SC) Metal aluminium plate
(SD) High-density polyethylene mesh (Tnickness of fiber: 0.2 mm, mesh size: 0.6 mm)
(SE) Polypropylene-made mesh (Inner diameter: 30 mm, Outer diameter: 36 mm)

The adhesive layer was formed by dipping method when the thickness thereof was 2 μm or less or the configuration of the substrate was other than plate-shaped, or by a method using a baker applicator when the substrate was plate-sshaped and the thickness thereof was formed to 2 μm or more. Temperature used for drying the adhesive layer was 80° C. only when the material of the substrate was (SD) or (SE), and it was at 120° C. in all other cases. The photocatalyst layer was formed by dipping method when the thickness thereof was 2 μm or less or the configuration of the substrate was other than plate-shaped, or by a method using a bar coator when the substrate was plate-shaped and the thickness thereof was formed to 2 μm or more. Drying of the photocatalyst layer was performed at the same temperature as the one for drying the adhesive layer. Hereunder, physical properties of the photocatalyst-carrying structures prepared in the examples and the reference examples, wherein type and content of the materials described above, the thickness of a film coated, method to form films, etc. were each modified, are presented in Tables 7 and 8.

TABLE 7

| Example | Carrier | Coating Solution for Adhesive Layer | | | Coating Solution for Photocatalyst Layer | | | | | Thickness of Adhesive Layer ($\mu$) | Thickness of Photo-catalyst Layer ($\mu$) |
|---|---|---|---|---|---|---|---|---|---|---|---|
| | | Type | Content*1 | Resin Sol. | Type | TiO$_2$ Content*2 | Z-1 Content*2 | Z-2 Content*2 | | | |
| Example-67 | SA | PS-1 | 10 | J-1 | C-1 | 20 | 20 | — | | 3 | 3 |
| Example-68 | SA | PS-1 | 5 | J-1 | C-1 | 2 | 0 | — | | 1 | 3 |
| Example-69 | SC | PS-1 | 20 | J-2 | C-1 | 5 | 5 | — | | 4 | 2 |
| Example-70 | SD | PS-2 | 20 | J-2 | C-2 | 30 | 10 | — | | 5 | 3 |
| Example-71 | SE | PS-2 | 30 | J-2 | C-2 | 10 | 10 | 0.3 | | 4 | 2 |

*1: Concentration of solid component of the resin in the coating solution.
*2: Concentration of solid component in the coating solution.

TABLE 8

| Example | Photocatalytic Activity | Adhesive Property | | Sunshine Weather Meter | | | Whole light Transmittance (%) |
|---|---|---|---|---|---|---|---|
| | | Before Durability Test | After Durability Test | After Boiling Water Test | Surface State aft. Test | Adh. Pro. after Test | |
| Example-67 | A | 10 | 10 | —*6 | A | 10 | 63 |
| Example-68 | A | 10 | 10 | —*6 | A | 10 | 75 |
| Example-69 | B | 10 | 10 | —*6 | A | 10 | —*5 |
| Example-70 | B | 10 | 10 | —*6 | A | —*3 | —*4 |
| Example-71 | B | 10 | 10 | 10 | A | 10 | 82 |

*3: Since cross-cut Scotch tape test could not be employed, the surface of the sticking tape was observed by using a binocular, however no adhesion of the photocatalyst layer was observed.
*4: The determination could not be made due to the difference in configuration.
*5: The determination could not be made because of an opaque carrier.
*6: No evaluation has been made.

For the samples obtained in the examples 67 through 71 and allowed to black light resistance test under a high temperature and high humiduty, dipping test in boiling water and accelerated weathering test by using Sunshine carbon arc weather meter, photocatalytic activity was respectively determined again beased on decomposed-amount of acetaldehyde by light that was the method employed for such determination before starting the tests described above. From the result that the same level of decomposed-amount of acetaldehyde as the ones obtained before allowing the samples to such tests above was obtained, it is demonstrated that the original photocatalytic activity has been fully maintained in the structures.

Example 72

A photocatalyst-carrying structure comprising titanium dioxide was prepared according to the same method as described in the example 67, and an antimicrobial test was carried out for the structure according to the method described above. The survival rate of colon bacillus on the structure with no radiation of light was 92%, 91% and 91% after 1, 2 and 3 hours, respectively, whereas the survival rate on the structure which was exposed to radiation of black light was 52%, 29% and 11% after 1, 2 and 3 hours, respectively. Further, the survival rate of colon bacillus on the structure exposed to radiation of flourescent lamp was 76%, 54% and 22% after 1, 2 and 3 hours, respectively, which showed higher antimicrobial activity than the structure placed in a dark site.

Example 73

Films Processed with Sticker

A solution for forming an adhesive layer was prepared by mixing 30% by weight of polysiloxane (Manufactured by Colcoat Co., Ltd., Trade name: Methyl Silicate 51) based on the weight of acryl-silicon resin and 5% by weight of a curing agent (silane coupler) based on the weight of acryl-silicon resin to a mixed solution of xylene and isopropanol (mixing ratio, 50:50) containing 25% by weight of acryl-silicon resin which contains 3% by weight of silicon, and was diluted with methyl ethyl ketone to adjust the concentration to 10% by weight on the solid component basis.

The diluted solution obtained was applied by gravure printing onto a polyester film (Trade name: Cosmoshine 50 $\mu$m) A4100 manufactured by Toyobo Co., Ltd. so as to form a film having a thickness of 1 $\mu$m after drying by using a microgravure coater (width: 70 cm) manufactured by Yasui Seiki Co., Ltd. at a speed of 15 m/sec and at dry zone temperature of 13.

The polyester film whereto an adhesive layer was formed was then applied with a coating material for forming a photocatalyst layer, which was prepared by dispersing titania sol acidified with nitric acid containing 20% by weight of titanium dioxide as a photocatalyst into silica sol acidified with nitric acid containing 20% of silicon oxide in the presence of a surfactant, and then diluting the dispersion with a mixture of ion-exchanged water and ethanol (mixing ratio, 50:50) to a concentration of 10% by weight on the solid components basis, by gravure printing same as for the adhesive layer to thereby obtain a polyester film formed with a photocatalyst layer having dried-thickness of 1 μm.

Next, to the surface of the photocatalyst-carrying structure compring polyester film whereto a photocatalyst was not applied, a solution prepared by adding 5% by weight on the solid basis of a coating agent for blocking thermic rays, STS-500, manufactured by Sumitomo Osaka Cement Co., Ltd. into a commercially-available sticker was applied by employing gravure printing method. The film applied with the sticker was winded while laminating the film with polyethylene film (Pyrene film-OT 20 μm) P-2161, manufactured by Toyobo Co., Ltd. at a process for drying and winding at the drying zone in the gravure printer, to thereby providing a sticking film.

This kind of films can be used for a sticking film for window glass for automobiles, home window glass, and window glass for medical facilities, and they are advantageously characterized from their properties, such as antimicrobial activity, soiling resistant property and deodorant property, as well as scattering-preventive films at breaking of glass.

Example 74

Plate Glass

To a plate glass made of soda lime having thickness of 1 mm and cut into a piece with a dimension of 5 cm×5 cm, a solution prepared by mixing 30% by weight of polysiloxane (methyl silicate 51, manufactured by Colcoat Co., Ltd.) based on the weight of acryl-silicon resin into a mixed solution of xylene and isopropanol (mixing ratio, 50:50) containing 25% by weight of acryl-silicon resin which contains 3% by weight of silicon, was applied by using No. 7 bar coater and was dried at 100° C. for 60 min. to form an adhesive layer. After allowing the plate glass to cooling under an ambient temperature, a coating material for forming a photocatalyst layer was prepared by dispersing titania sol acidified with nitric acid containing 20% by weight of titanium dioxide into silica sol acidified with nitric acid containing 20% by weight of silicon oxide in the presence of a surfactant. The solution obtained was then applied onto the adhesive layer described above by using No. 7 bar coater as well, and was then dried for 60 min. at 100° C. to thereby obtain a photocatalyst-carrying glass plate (Sample No. 1).

Example 75

Glass Fiber Papers

The solution for forming an adhesive layer used in the example 74 was diluted with xylene-propanol solution (mixing ratio, 50:50) to obtain a concentration of 5% by weight on the solid component basis. A glass fiber paper, SAS-030 (weight: 30 g/m²) manufactured by Oribest Co., Ltd. was dipped in the diluted solution prepared as described above and was then pulled out, allowed to stand and dried at 100° C. for 120 min. to form an adhesive layer on the surface of the said glass fiber paper. Then, the glass fiber paper whereto the adhesive layer was formed was dipped into a solution prepared by diluting the coating material for forming a photocatalyst layer used in the example 74 with ion-exchanged water to a concentration of 10% by weight, and was pulled out and dried at 100° C. for 120 min. to obtain a photocatalyst-carrying glass fiber paper (Sample No. 2).

Example 76

Lens for Glasses

An adhesive layer was formed onto lens for glasses, PC pointal coat TC(+)1.00S 0.00 65 mmΦ manufactured by Nikon Corporation, by applying a solution prepared by admixing polysiloxane (Methyl Silicate 51 manufactured by Colcoat Co., Ltd.) 20% by weight based on the weight of acryl-silicon resin into a mixed solution of xylene and isopropanol (mixing ratio, 50:50) containing 10% by weight of acryl-silicon resin which contains 3% by weight of silicon onto the lens according to dipping method as described in the example 75, and the coated-lens were dried at 100° C. for 20 min. After cooling the lens at an ambient temperature, a coating material for forming a photocatalyst layer was prepared by dispersing titania sol as a photocatalyst acidified with nitric acid and containing 5% by weight of titanium dioxide into silica sol acidified with nitric acid and containing 5% silicon oxide in the presence of a surfactant. Using this coating material for photocatalyst layer and employing dipping method similarly, a photocatalyst layer was formed by coating the said coating material onto the surface of said adhesive layer and was dried at 100° C. for 20 min. to obtain photocatalyst-carrying lens for glasses (Sample No. 3).

Example 77

Wall Papers made of Poly(Vinyl Chloride)

A solution prepared by mixing polysiloxane (Methyl Silicate 51 manufactured by Colcoat Co., Ltd.) 30% by weight based on the weight of acryl-silicon resin into a mixed solution of xylene and isopropanol (mixing ratio, 50:50) containing 25% by weight of acryl-silicon resin which contains 3% by weight of silicon was applied onto a wall paper made of poly(vinyl chloride)(SG 5328, manufactured by Sangetsu Co., Ltd.) cut into a piece with a demension of 5 ccm×5 cm and a thickness of 1 mm by using a bar coater No. 7, and the applied-paper was then dried at 100° C. for 20 min. to obtain an adhesive layer. After cooling the paper at an ambient temperature, a coating material for forming a photocatalyst layer was prepared by dispersing titania sol as a photocatalyst acidified with nitric acid and containing 20% by weight of titanium dioxide into silica sol acidified with nitric acid and containing 20% silicon oxide in the presence of a surfactant. Applying this solution onto the surface of the adhesive layer by using a bar coater No. 7, and the paper coated was dried at 100° C. for 20 min. to obtain a photocatalyst-carrying wall paper (Sample No. 4).

Example 78

Polyester Films

The solution for forming an adhesive layer used in the example 77 was diluted with a mixed solution of xylene and isopropanol (mixing ratio, 50:50) to adjust the concentration of the mixture to 25% by weight on the solid components basis. The diluted solution was then applied by gravure printing at a speed of 10 m/min. and at dry zone temperature of 130° C. onto a polyester film (Cosmoshine) A4100 manufactured by Toyobo Co., Ltd. by using a microgravure coater (width: 70 cm) manufactured by Yasui Seiki Co., Ltd. to form a film with a thickness after drying of 3 μm. Then, the polyester film formed with an adhesive layer was further applied with the coating material for forming a photocatalyst layer used in the example 77 according to gravure printing to thereby obtain a photocatalyst-carrying polyester film provided with a photocatalyst layer having a thickness after drying of 3 μm (Sample No. 5).

Example 79

Protective Filters for Personal Computers

A solution for forming an adhesive layer was prepared by mixing polysiloxane (Methyl Silicate 51 manufactured by Colcoat Co., Ltd.) 30% by weight on the solid component basis relative to the weight of acryl-silicon resin into a xylene solution containing 20% by weight of acryl-silicon resin which contains 20% by weight of silicon and was diluted with an isopropanol solution to adjust the concentration to 20% by weight on the solid component basis. Then, the solution was applied by dipping onto VDT filter, E-filter III, manufactured by Toray Co., Ltd., and the filter coated was then dried at 100° C. for 20 min. to form an adhesive layer on the surface of the filter. Subsequently, the VDT protective filter formed with adhesive layer was further allowed to dipping process in a solution prepared by diluting the coating material used in the example 77 with ion-exchanged water to the extent that the content of solid component in the coating material to be 10% by weight, pulled out therefrom and dried at 100° C. for 20 min. to obtain a photocatalyst-carrying VDT filter (Sample No. 6).

Example 80

Telephone Set Cases

The solution for forming an adhesive layer used in the example 77 was diluted with a mixed solution of xylene and isopropanol (mixing ratio, 50:50) to adjust the concentration of the solution to 20% by weight on the solid component basis. The diluted-solution was applied by spraying to a case for a telephone set (Type: HIT-1, Manufactured by Hitachi Seisakusho Co., Ltd.) by using a spray gun (Type: WIDER 88, Manufactured by Iwata Tosoki Kogyo Co., Ltd). After drying the sprayed-case at 100° C. for 20 min., a coating material for forming a photocatalyst layer used in the example 1 was adjusted by dilution with ion-exchanged water to a concentration of 8% by weight on the solid component basis, and the diluted-coating material was applied by spraying as described above. After drying the case at 100° C. for 20 min., a photocatalyst-carrying telephone set case was obtained (Sample No. 7).

Example 81

Lens for Glasses

An adhesive layer was formed onto lens for glasses, NL70HCCTc(+) 1.00S 0.00 (70 mmΦ) manufactured by Nikon Corporation, by applying a solution prepared by admixing polysiloxane (Methyl Silicate 51 manufactured by Colcoat Co., Ltd.) 20% by weight based on the weight of acryl-silicon resin into a mixed solution of xylene and isopropanol (mixing ratio, 50:50) containing 10% by weight of acryl-silicon resin which contains 3% by weight of silicon onto the lens according to dipping method as described in the example 79, and the coated-lens were dried at 100° C. for 20 min. After cooling the lens at an ambient temperature, a coating material for forming a photocatalyst layer, which was prepared by dispersing titania sol as a photocatalyst acidified with nitric acid and containing 15% by weight of titanium dioxide into silica sol acidified with nitric acid and containing 15% silicon oxide in the presence of a surfactant, was applied onto the lens to form a photocatalyst layer. Using this solution for photocatalyst layer and employing the same dipping method, a photocatalyst layer was formed by coating the solution onto the surface of said adhesive layer and was dried at 100° C. for 20 min. to obtain photocatalyst-carrying lens for glasses (Sample No. 8).

Example 82

Curtains

Textile fabrics for curtains, trade name "Hospia" (for school and hospital use) manufactured by Kawashima Orimono Co., Ltd. were cut into a piece with a dimension of 7 cm×7 cm, and the pieces were dipped into a solution prepared by mixing polysiloxane (Methyl Silicate 51 manufactured by Colcoat Co., Ltd.) 20% by weight on the solid component basis relative to the weight of acryl-silicon resin into a mixed solution of xylene and isopropanol (mixing ratio, 50:50) containing 15% by weight of epoxy-silicon resin which contains 3% by weight of silicon, pulled out therefrom and dried at 80° C. for 120 min. After cooling the fabrics at an ambient temperature, the textile fabrics whereto an adhesive layer was formed thereon was dipped into a coating material for forming photocatalyst layer which was prepared by dispersing titania sol produced by Ammonia Alkali containing 10% by weight of titanium dioxide into silica sol containing 10% by weight of silicon oxide in the presence of a surfactant, pulled out therefrom and dried at 80° C. for 120 min. to obtain a photocatalyst-carrying textile fabric for curtain use (Sample No. 9).

Example 83

Nonwoven Fabrics

Non-bleached nonwoven fabric made of cotton (Trade name: Orcos, Manufactured by Nisshinbo Co., Ltd.) was cut into pieces each having a dimension of 7 cm×7 cm, and each piece was sprayed with a solution prepared by mixing polysiloxane (Methyl Silicate 51 manufactured by Colcoat Co., Ltd.) 30% by weight based on the weight of acryl-slicon resin into a mixed solution of xylene and isopropanol (mixing ratio, 50:50) containing 25% by weight of acryl-silicon resin which contains 3% by weight of silicon by using a spray gun (Type: WIDER 88, Manufactured by Iwata Tosoki Kogyo Co., Ltd.). After drying the sprayed fabric at 100° C. for 30 min., the solution for forming a photocatalyst layer used in the example 82 was applied to the said fabric, and the applied fabric was then dried at 100° C. for 30 min. to obtain a photocatalyst-carrying cotton nonwoven fabric suitable for surgical gowns, tablecloths, covers for a toilet seat, shoji papers, covering sheets for seedlings, food packaging materials, etc.

Example 84

Printed Polyester Cloth Fabrics for Umbrella

Using commercially available printed polyester cloth fabrics for umbrella use as a substrate, an adhesive layer and a photocatalyst layer were coated thereon according to the same method disclosed in the example 83. The photocatalyst-carrying printed polyester cloth fabric obtained here was found to have almost no difference in patterns and feeling from normal cloth fabrics (Sample No. 11).

Example 85

Wall Papers (Woven Cloth)

Using a plain woven cloth, SG 6758, manufactured by Sangetsu Co., Ltd. as a substrate, an adhesive layer and a photocatalyst layer were formed onto the cloth according to the method disclosed in the example 83. The photocatalyst-carrying woven cloth wall paper did not give bad influence on the quality of the woven cloth (Sample No. 12).

Example 86

Aluminum Sash

A solution prepared by mixing polysiloxane (Methyl Silicate 51, manufactured by Colcoat Co., Ltd.) 30% by weight based on the weight of acryl-silicon resin into a mixed solution of xylene and isopropanol (mixing ratio, 50:50) containing 25% by weight of acryl-silicon resin which contains 3% by weight of silicon was applied onto a aluminum sash plate cut into a piece with a dimension of 7 cm×7 cm by using a bar coater No. 7 and the aluminum sash plate was dried at 100° C. for 60 min. to form an adhesive layer on the plate. After cooling the plate at an ambient temperature, a coating material for forming a photocatalyst layer was prepared by dispersing titania sol acidified with nitric acid containing 20% by weight of titanium dioxide into silica sol acidified with nitric acid containing 20% by weight of silicon oxide in the presence of a surfactant. The coating material was then applied onto the surface of the adhesive layer described above by using a bar coater No. 7, and the applied plate was dried at 130° C. for 10 min. to obtain a photocatalyst-carrying aluminum plate (Sample No. 13).

Example 87

Stainless Steel Plates

The solution for forming an adhesive layer used in the example 86 was adjusted by dilution with a mixed solution of xylene and isopropanol (mixing ratio, 50:50) to a concentration of 5% by weight on the solid compomnent basis. A stainless steel plate made of SUS 316 (Thickness: 0.2 mm) cut into a piece with a dimension of 7 cm×7 cm was dipped into the solution described above, pulled out therefrom and dried at 120° C. for 20 min. to form an adhesive layer on the surface of the stainless steel plate. Then, the stainless steel plate whereto an adhesive layer was formed was dipped into a solution prepared by adjusting the concentration of the coating material for a photocatalyst layer used in the example 86 with ion-exchanged water to a concentratiob of 10% by weight, pulled out therefrom and dried at 120° C. for 20 min. to obtain a photocatalyst-carrying stainless steel plate (Sample No. 14).

Example 88

Tin Plates

A tin plate having a thickness of 1 mm cut into a piece with a dimension of 7 cm×7 cm was dipped into a solution prepared by mixing polysiloxane (Methyl Silicate 51, manufactured by Colcoat Co., Ltd.) 30% by weight based on the weight of acryl-silicon resin into 20% by weight of xylene solution of acryl-silicon resin which contains 20% by weight of silicon and then diluting the mixture with isopropanol solution up to a concentration of 20% by weight on the solid component basis, pulled out therefrom and dried at 100° C. for 60 min. to form an adhesive layer on the tin plate. The tin plate on which an adhesive layer was formed was then dipped into a solution prepared by adjusting the coating material for forming a photocatalyst layer used in the example 86 by dilution with ion-exchanged water to a concentration of 10% by weight, pulled out from the solution and dried at 100° C. for 60 min, to obtain a photocatalyst-carrying tin plate (Sample No. 15).

Example 89

Blinds

After removing a slat having a width of 800 mm and a height of 700 mm of a blind, "Silky Curtain" (15 mm slat width type) T-12 (white), manufactured by Tachikawa Blind Industry Co., Ltd., a solution prepared by mixing polysiloxane (Methyl Silicate 51, manufactured by Colcoat Co., Ltd.) of 30% by weight based on the weight of acryl-silicon resin into a mixed solution of xylene and isopropanol (mixing ratio, 50:50) containing 25% by weight of acryl-silicon resin which comprises 3% by weight of silicon was apllied by spraying by using a spray gun, WIDER 88, manufactured by Iwata Tosoki Kogyo Co., Ltd. After drying the sprayed-blind at 120° C. for 20 min., the blind was further applied by spraying with a solution prepared by diluting the coating material for forming a photocatalyst layer used in the example 86 with ion-exchanged water to a concentration of 8% by weight on the solid component basis (Sample No. 16).

Example 90

Printed Plywood

A printed plywood, Neowood, having a thickness of 2.5 mm and cut into a piece with a dimension of 7 cm×7 cm, manufactured by Eidai Sangyo Co., Ltd. was applied with a solution prepared by mixing polysiloxane (Methyl Silicate 51, manufactured by Colcoat Co., Ltd.) 30% by weight based on the weight of acryl-silicon resin into a mixed solution of xylene and isopropanol (mixing ratio, 50:50) containing 25% by weight of acryl-silicon resin which comprises 3% by weight of silicon by using a bar coater No. 7 and was then dried at 100° C. for 30 min. to form an adhesive layer on the printed plywood. After cooling the printed plywood at an ambient temperature, a coating material for forming a photocatalyst layer was prepared by dispersing titania sol acidified with nitric acid containing 20% by weight of titanium dioxide into silica sol acidified with nitric acid containing 20% silicon oxide in the presence of a surfactant. Using this coating material and a bar coater No. 7, the coating material was applied on the surface of the adhesive layer and was dried at 100° C. for 30 min. to obtain a photocatalyst-carrying printed plywood (Sample No. 17).

Example 91

Synthetic Timbers

The solution for forming an adhesive layer used in the example 90 was diluted with a mixed solution of xylene and isopropanol (mixing ratio, 50:50) to a concentration of 5% by weight on the solid component basis. A synthetic timber, Esron Neolamber FFU-50, manufactured by Sekisui Chemical Industry Co., Ltd. and cut into a piece with a dimension of 7 cm×7 cm was dipped into the diluted solution prepared above, pulled out therefrom and dried at 100° C. for 120 min. to form an adhesive layer on the surface of the timber. The timber on which the adhesive layer was formed was then dipped into a solution prepared by diluting the coating material for forming a photocatalyst layey used in the exmple 90 with ion-exchanged water to a concentration of 10% by weight, pulled out therefrom and dried at 100° C. for 120 min. to obtain a photocatalyst-carrying synthetic timber (Sample No. 18).

Example 92

Wooden Doors

An indoor use wooden door (Type 38 RC0202-IR6, Oak pattern) manufactured by Daiken Kogyo C., Ltd. was cut into a piece with a dimension of 7 cm×7 cm, and the piece was applied with a solution prepared by mixing polysiloxane (Methyl Silicate 51, manufactured by Colcoat Co., Ltd.) 20% by weight based on the weight of acryl-silicon resin (mixing ratio, 50:50) containing 10% by weight of acryl-silicon resin which comprises 3% by weight of silicon according to the dipping method similar to the one as described in the example 91 to form an adhesive layer and was dried at 100° C. for 20 min. After cooling the piece at an ambient temperature, a coating material for forming a photocatalyst layer was prepared by dispersing titania sol acidified with nitric acid containing 5% by weight of titanium dioxide into silica sol acidified with nitric acid containing 5% by weight of silicon oxide in the presence of a surfactant. This coating material was applied onto the surface of the adhesive layer by employing the dipping method described above and dried at 100° C. for 20 min. to obtain a photocatalyst-carrying wooden door.

Evaluation for Photocatalytic Activity

Photocatalytic activity of the samples 1 through 19 was evaluated respectively, and the results in the evaluation were presented in Table 9.

TABLE 9

|  | Total Ray Transmissibity % | Aldehyde Decomposing Activity | Salad Oil Decomposing Activity | Antimicrobial Activity | Initail Adhesvie Property Points | Durability pt |
|---|---|---|---|---|---|---|
| Sample 1 | 85% | A | A | A | 10 Points | 10 pt |
| Sample 2 | 65 | B | A | — | 5% or less weight reduction by 10 min. ultrasonification | Same as Initail Adhesive Property |
| Sample 3 | 90 | B | B | A | 10 | 10 |
| Sample 4 | — | B | A | A | 10 | 10 |
| Sample 5 | 90 | A | A | A | 10 | 10 |
| Sample 6 | — | B | A | A | 10 | 10 |
| Sample 7 | — | B | A | A | 10 | 10 |
| Sample 8 | 95 | B | B | A | 10 | 10 |
| Sample 9 | — | A | A | A | *1 | *1 |
| Sample 10 | — | A | A | A | *1 | *1 |
| Sample 11 | — | B | A | A | *1 | *1 |
| Sample 12 | — | B | A | A | *1 | *1 |
| Sample 13 | — | A | A | A | 10 | 10 |
| Sample 14 | — | B | A | A | 10 | 10 |
| Sample 15 | — | A | A | A | 10 | 10 |
| Sample 16 | — | B | A | B | 8 | 8 |
| Sample 17 | — | B | A | A | 8 | 8 |
| Sample 18 | — | A | A | A | 10 | 10 |
| Sample 19 | — | A | A | A | 10 | 10 |

*1: Since basic grain tape method could not be employed, the surface of the sticking tape was observed, however, no adhesion of the photocatalyst layer was recognized.

Industrial Use

The photocatalyst-carrying structure according to the present invention has high photocatalytic activity, and glass, plastics, metallic materials, cloth fabrics, timbers and wooden materials, which respectively carry a photocatalyst being resistant to deterioration and highly durable, can be useful for lens, various types of window glass, adhesive films, sheets for decoration, wall papers, curtains, construction materials, such as blinds, interior goods, etc.

What is claimed is:

1. A photocatalyst-carrying structure comprising a photocatalyst layer, an adhesive layer and a substrate, wherein the adhesive layer is disposed between the photocatalyst layer and the substrate and comprises a silicon-modified resin, the adhesive layer containing from 2 to 60% by weight silicon;

a resin containing colloidal silica, wherein the adhesive layer comprises from 5 to 40% by weight of said colloidal silica; or a resin containing polysiloxane, which is a polycondensation product of a compound represented by a formula (1)

$$SiCln_1(OH)n_2R^1n_3(OR^2)n_4 \qquad (1),$$

wherein $R^1$ is an alkyl having 1–8 carbon atoms and is unsubstituted or substituted by amino, carboxyl or chlorine atom; $R^2$ is an alkyl having 1–8 carbon atoms or an alkoxy-substituted alkyl having 1–8 carbon atoms; $n_1$ is an integer, 0, 1 or 2; $n_2$ and $n_3$ are each independently an integer, 0, 1, 2, or 3; $n_4$ is an integer, 2, 3, or 4; and $n_1+n_2+n_3+n4=4$, wherein the resin comprises from 3 to 60% by weight polysiloxane; and wherein the photocatalyst layer comprises a photocatalyst particle and 25 to 95% by weight of a metal oxide gel or a metal hydroxide gel.

2. The photocatalyst-carrying structure according to claim 1, wherein the silicon-modified resin used for the adhesive layer is acryl-silicon resin.

3. The photocatalyst-carrying structure according to claim 1, wherein the adhesive layer is composed of a resin containing polysiloxane, and said polysloxane is made of either a hydrolyzed product of silicon alkoxide containing at least one $C_1$–$C_5$ alkoxy or a compound prepared via the said hydrolyzed product.

4. The photocatalyst-carrying structure according to claim 1, wherein the adhesive layer is made of silicon-modified resin containing polysiloxane.

5. The photocatalyst-carrying structure according to claim 1, wherein the adhesive layer is made of a resin containing colloidal silica and the diameter of the particles of the colloidal silica is 10 nm or less.

6. The photocatalyst-carrying structure according to claim 1, wherein the adhesive layer is made of silicon-modified resin containing colloidal silica.

7. The photocatalyst-carrying structure according to claim 1, wherein the metal oxide gel or the metal hydroxide gel contained in the photocatalyst layer is gel and their specific surface area dried at 150° C. is 100 m²/g or more, and is composed of one or more gels of metals selected from a group consisting of silicon, aluminium, titanium, zirconium, magnesium, niobium, tantarum, tungsten and tin, respectively.

8. The photocatalyst-carrying structure according to claim 1, wherein the photocatalyst layer is a photocatalyst complex composed of more than 2 kinds of metal oxide gels or metal hydroxide gels and a phohtocatalyst, and the adhesive property of the complex after dipping it into boiling water which shows an electroconductivity of 200 μS/cm at 20° C. is expressed as an evaluated-point of 6 or more according to cross-cut Scotch tape test provided in JIS K5400.

9. The photocatalyst-carrying structure according to claim 8, wherein the photocatalyst layer is composed of a photocatalyst complex, which comprises oxide gel or hydroxide gel of one or more metals selected from a group consisting of aluminium, titanium, zirconium and niobium, and silicon, and has a specific surface area after drying at 150° C. of 50 m²/g or more.

10. The photocatalyst-carrying structure according to claim 1, wherein the photocatalyst layer is composed of a photocatalyst complex which contains either silicon-modified resin or silane compound 10 to 50% by weight, either a metal oxide gel or a metal hydroxide gel from 15 to 85% by weight on the solid component basis and a photocatalyst from 5 to 75% by weight, and the photocatalyst complex has an adhesive property of point 6 or more expressed from the criterion according to cross-cut Scotch tape test provided in JIS K5400 after dipping it for 15 min. into boiling water which shows an electroconductivity of 200 μS/cm at 20° C.

11. The photocatalyst-carrying structure according to claim 10, wherein the silicon-modified resin or the silane compound contained in the photocatalyst layer is acryl-silicon resin, epoxy-silicon resin or a silane coupler.

12. The photocatalyst-carrying structure according to claim 1, characterized in that the adhesive property of the structure after exposing it to black light radiation of which ultraviolet light intesity is 3 mW/cm² for 500 hours at 40° C. and 90% R.H. is evaluated as point 6 or more according to the criterion of cross-cut Scotch tape test provided in JIS K5400.

13. A photocatalyst-carrying glass, characterized in that the glass has a constitution wherein an adhesive layer is provided in between a photocatalyst layer and a substrate, and the adhesive layer and the photocatalyst layer described in claim 1 are used therein.

14. A photocatalyst-carrying plastic molding which has a structure wherein an adhesive layer is provided in between a photocatalyst layer and a plactic molding, and the photocatalyst layer and the adhesive layer used therein are the ones described in claim 1.

15. A sticking film prepared by applying a sticker onto the back side of the photocatalyst-carrying plastic film described in claim 14.

16. A photocatalyst-carrying cloth which has a structure wherein an adhesive layer is provided in between a photocatalyst layer and a substrate, and the photocatalyst layer and the adhesive layer used therein are the ones described in claim 1.

17. A photocatalyst-carrying metal which has a structure wherein an adhesive layer is provided in between a photocatalyst layer and the metal, and the photocatalyst layer and the adhesive layer used therein are the ones described in claim 1.

18. A photocatalyst-carrying timber and a photocatalyst-carrying wooden material which respectively has a structure wherein an adhesive layer is provided in between a photocatalyst layer and the timber or the wooden material, and the photocatalyst layer and the adhesive layer used therein are the ones described in claim 1.

19. The structure of claim 1 wherein the adhesive layer comprises a silicon modified resin.

20. The structure of claim 1 wherein the adhesive layer comprises a resin containing colloidal silica.

21. The structure of claim 1 wherein the adhesive layer comprises a resin comprising polysiloxane.

22. A coating material of a photocatalyst comprising 0.001 to 5% by weight silicon compounds; 0.1 to 30% by weight of a metal oxide sol and/or a metal hydroxide sol, on the solid component basis and from 0.1 to 30.0% by weight on the solid component basis a photocatalyst powder and/or sol.

23. The coating material of a photocatalyst according to claim 22, wherein the silicon compound is an alkoxy silane compound represented by a general formula (2),

$$SiR^3{n5}(OR^4)_{4-n5} \qquad (2),$$

wherein $R^3$ is an alkyl having 1–8 carbon atoms optionally substituted with amino, chlorine atom or carboxy, $R^4$ is alkyl having 1–8 carbon atoms or alkoxy-substituted alkyl having 1–8 carbon atoms, and $n_5$ is 0, 1, 2 or 3, or one or more of the hydrolized products of the such compound.

24. The coating material of a photocatalyst according to claim 22, characterized in that the metal oxide sol and/or the matal hydroxide sol comprise a metal selected from a group consisting of silicon, aluminium, titanium, zirconium, niobium, tantalum, magnesium, tungsten and tin, and the specific surface area of such sol after drying at 150° C. is 50 m$^2$/g or more, respectively.

25. The coating material of a photocatalyst according to claim 22, characterized in that the silicon compound is composed of one or more compounds selected from a group consisting of tetramethoxy silane, tetraethoxy silane, methyl trimethoxy silane, methyl triethoxy silane and their hydrolized products.

26. A coating of a photocatalyst used for producing a photocatalyst-carrying structure wherein an adhesive layer is disposed between a photocatalyst layer and a substrate wherein the coating comprises two coating materials (1) and (2), wherein (1) is a coating material for forming said adhesive layer and wherein (1) comprises a resin component, said resin component comprising from 1 to 50% by weight of a silicon-modified resin containing 2–60% by weight of silicon and either a resin containing 3–60% by weight of polysiloxane or a resin containing 5–40% by weight of colloidal silica, and (2) a coating material for forming a photocatalyst layer onto the adhesive layer comprise 0.001–5% by weight of a silicon compound, 0.1–30% by weight of a metal oxide sol and/or a metal hydroxide sol on the solid component basis and 0.1–30% by weight of a photocatalyst powder and/or sol on the solid component basis.

27. The coating material of a photocatalyst according to claim 26, wherein the resin contained in the coating material for forming an adhesive layer is a resin containing polysiloxane, and said polysiloxane is the hydrolized product of alkoxy silane with an alkoxy group having 1–5 carbon atoms or an other compound produced from said hydrolized product.

28. The coating material of a photocatalyst according to claim 26, wherein the resin contained in the coating material for forming an adhesive layer is a resin containing colloidal silica, and the diameter of said colloidal silica is 10 nm or less.

29. The coating material of a photocatalyst according to claim 26, wherein the resin contained in the coating material for forming an adhesive layer is silicon-modified resin containing polysiloxane.

30. The coating material of a photocatalyst according to claim 26, wherein the resin contained in the coating material for forming an adhesive layer is silicon-modified resin containing colloidal silica.

* * * * *